US009871301B2

(12) United States Patent
Contopanagos

(10) Patent No.: US 9,871,301 B2
(45) Date of Patent: Jan. 16, 2018

(54) INTEGRATED MINIATURE PIFA WITH ARTIFICIAL MAGNETIC CONDUCTOR METAMATERIALS

(71) Applicant: Energous Corporation, Pleasanton, CA (US)

(72) Inventor: Harry Contopanagos, Kifissia (GR)

(73) Assignee: Energous Corporation, San Jose, CA (US)

( * ) Notice: Subject to any disclaimer, the term of this patent is extended or adjusted under 35 U.S.C. 154(b) by 627 days.

(21) Appl. No.: 14/336,971

(22) Filed: Jul. 21, 2014

(65) Prior Publication Data
US 2016/0020648 A1 Jan. 21, 2016

(51) Int. Cl.
| H01Q 15/02 | (2006.01) |
| H01Q 19/10 | (2006.01) |
| H01Q 19/185 | (2006.01) |
| H01Q 9/04 | (2006.01) |
| H01Q 1/38 | (2006.01) |
| H02J 50/23 | (2016.01) |
| H01Q 13/10 | (2006.01) |
| H01Q 3/44 | (2006.01) |

(Continued)

(52) U.S. Cl.
CPC ............ *H01Q 19/10* (2013.01); *H01Q 1/38* (2013.01); *H01Q 9/0421* (2013.01); *H01Q 15/006* (2013.01); *H01Q 19/185* (2013.01); *H02J 50/23* (2016.02); *H01Q 1/273* (2013.01); *H01Q 3/44* (2013.01); *H01Q 13/10* (2013.01); *H01Q 15/0006* (2013.01)

(58) Field of Classification Search
CPC ...... H01Q 15/0006; H01Q 3/44; H01Q 1/273; H01Q 13/10; H01Q 1/38

USPC .......... 343/909, 700 MS, 846, 718, 770, 767
See application file for complete search history.

(56) References Cited

U.S. PATENT DOCUMENTS

| 787,412 A | 4/1905 | Tesla |
| 3,434,678 A | 5/1965 | Brown et al. |
| 3,696,384 A | 10/1972 | Lester |

(Continued)

FOREIGN PATENT DOCUMENTS

| CN | 203826555 U | 9/2014 |
| CN | 104090265 A | 10/2014 |

(Continued)

OTHER PUBLICATIONS

Energous Corp., ISRWO, PCT/US2014/037170, Sep. 15, 2014, 11 pgs.

(Continued)

*Primary Examiner* — Joseph Lauture
(74) *Attorney, Agent, or Firm* — Morgan, Lewis & Bockius LLP

(57) ABSTRACT

Integrated antenna structures described herein may include planar inverted-F antennas (PIFAs) integrated with artificial magnetic conductor (AMC) metamaterials. The integrated metamaterial operatively coupled with the PIFA may function as an artificial magnetic reflector, sending all the energy radiated upwards, and thereby changing the original omnidirectional radiation pattern of the PIFA to a directional radiation pattern. The integrated antenna structures that include PIFAs and metamaterials may maintain a smaller form factor as compared to similar directional antennas, while exhibiting a suitable performance in terms of radiation efficiency, radiation pattern and impedance bandwidth.

28 Claims, 15 Drawing Sheets

(51) Int. Cl.
*H01Q 1/27* (2006.01)
*H01Q 15/00* (2006.01)

(56) References Cited

U.S. PATENT DOCUMENTS

| | | |
|---|---|---|
| 3,754,269 A | 8/1973 | Clavin |
| 4,101,895 A | 7/1978 | Jones, Jr. |
| 4,360,741 A | 11/1982 | Fitzsimmons et al. |
| 4,944,036 A | 7/1990 | Hyatt |
| 4,995,010 A | 2/1991 | Knight |
| 5,200,759 A | 4/1993 | McGinnis |
| 5,211,471 A | 5/1993 | Rohrs |
| 5,548,292 A | 8/1996 | Hirshfield et al. |
| 5,556,749 A | 9/1996 | Mitsuhashi et al. |
| 5,568,088 A | 10/1996 | Dent et al. |
| 5,646,633 A | 7/1997 | Dahlberg |
| 5,697,063 A | 12/1997 | Kishigami et al. |
| 5,712,642 A | 1/1998 | Hulderman |
| 5,936,527 A | 8/1999 | Isaacman et al. |
| 5,982,139 A | 11/1999 | Parise |
| 6,046,708 A | 4/2000 | MacDonald, Jr. et al. |
| 6,127,799 A | 10/2000 | Krishnan |
| 6,127,942 A | 10/2000 | Welle |
| 6,163,296 A | 12/2000 | Lier et al. |
| 6,289,237 B1 | 9/2001 | Mickle et al. |
| 6,329,908 B1 | 12/2001 | Frecska |
| 6,421,235 B2 | 7/2002 | Ditzik |
| 6,437,685 B2 | 8/2002 | Hanaki |
| 6,456,253 B1 | 9/2002 | Rummeli et al. |
| 6,476,795 B1 | 11/2002 | Derocher et al. |
| 6,501,414 B2 | 12/2002 | Amdt et al. |
| 6,583,723 B2 | 6/2003 | Watanabe et al. |
| 6,597,897 B2 | 7/2003 | Tang |
| 6,615,074 B2 | 9/2003 | Mickle et al. |
| 6,664,920 B1 | 12/2003 | Mott et al. |
| 6,798,716 B1 | 9/2004 | Charych |
| 6,803,744 B1 | 10/2004 | Sabo |
| 6,853,197 B1 | 2/2005 | McFarland |
| 6,856,291 B2 | 2/2005 | Mickle et al. |
| 6,911,945 B2 | 6/2005 | Korva |
| 6,960,968 B2 | 11/2005 | Odendaal et al. |
| 6,967,462 B1 | 11/2005 | Landis |
| 6,988,026 B2 | 1/2006 | Breed et al. |
| 7,003,350 B2 | 2/2006 | Denker et al. |
| 7,027,311 B2 | 4/2006 | Vanderelli et al. |
| 7,068,234 B2 | 6/2006 | Sievenpiper |
| 7,068,991 B2 | 6/2006 | Parise |
| 7,183,748 B1 | 2/2007 | Unno et al. |
| 7,191,013 B1 | 3/2007 | Miranda et al. |
| 7,196,663 B2 | 3/2007 | Bolzer et al. |
| 7,205,749 B2 | 4/2007 | Hagen et al. |
| 7,222,356 B1 | 5/2007 | Yonezawa et al. |
| 7,274,334 B2 | 9/2007 | o'Riordan et al. |
| 7,274,336 B2 | 9/2007 | Carson |
| 7,351,975 B2 | 4/2008 | Brady et al. |
| 7,359,730 B2 | 4/2008 | Dennis et al. |
| 7,392,068 B2 | 6/2008 | Dayan |
| 7,403,803 B2 | 7/2008 | Mickle et al. |
| 7,451,839 B2 | 11/2008 | Perlman |
| 7,463,201 B2 | 12/2008 | Chiang et al. |
| 7,471,247 B2 | 12/2008 | Saily |
| 7,535,195 B1 | 5/2009 | Horovitz et al. |
| 7,614,556 B2 | 11/2009 | Overhultz et al. |
| 7,639,994 B2 | 12/2009 | Greene et al. |
| 7,643,312 B2 | 1/2010 | Vanderelli et al. |
| 7,652,577 B1 | 1/2010 | Madhow et al. |
| 7,702,771 B2 | 4/2010 | Ewing et al. |
| 7,786,419 B2 | 8/2010 | Hyde et al. |
| 7,812,771 B2 | 10/2010 | Greene et al. |
| 7,830,312 B2 | 11/2010 | Choudhury et al. |
| 7,844,306 B2 | 11/2010 | Shearer et al. |
| 7,868,482 B2 | 1/2011 | Greene et al. |
| 7,898,105 B2 | 3/2011 | Greene et al. |
| 7,904,117 B2 | 3/2011 | Doan et al. |
| 7,911,386 B1 | 3/2011 | Ito et al. |
| 7,925,308 B2 | 4/2011 | Greene et al. |
| 8,055,003 B2 | 11/2011 | Mittleman et al. |
| 8,070,595 B2 | 12/2011 | Alderucci et al. |
| 8,072,380 B2 | 12/2011 | Crouch |
| 8,092,301 B2 | 1/2012 | Alderucci et al. |
| 8,099,140 B2 | 1/2012 | Arai |
| 8,115,448 B2 | 2/2012 | John |
| 8,159,090 B2 | 4/2012 | Greene et al. |
| 8,159,364 B2 | 4/2012 | Zeine |
| 8,180,286 B2 | 5/2012 | Yamasuge |
| 8,228,194 B2 | 7/2012 | Mickle |
| 8,264,101 B2 | 9/2012 | Hyde et al. |
| 8,264,291 B2 | 9/2012 | Morita |
| 8,276,325 B2 | 10/2012 | Clifton et al. |
| 8,278,784 B2 | 10/2012 | Cook et al. |
| 8,284,101 B2 | 10/2012 | Fusco |
| 8,310,201 B1 | 11/2012 | Wright |
| 8,362,745 B2 | 1/2013 | Tinaphong |
| 8,380,255 B2 | 2/2013 | Shearer et al. |
| 8,410,953 B2 | 4/2013 | Zeine |
| 8,411,963 B2 | 4/2013 | Luff |
| 8,432,062 B2 | 4/2013 | Greene et al. |
| 8,432,071 B2 | 4/2013 | Huang et al. |
| 8,446,248 B2 | 5/2013 | Zeine |
| 8,447,234 B2 | 5/2013 | Cook et al. |
| 8,451,189 B1 | 5/2013 | Fluhler |
| 8,452,235 B2 | 5/2013 | Kirby et al. |
| 8,457,656 B2 | 6/2013 | Perkins et al. |
| 8,461,817 B2 | 6/2013 | Martin et al. |
| 8,467,733 B2 | 6/2013 | Leabman |
| 8,497,658 B2 | 7/2013 | Von Novak et al. |
| 8,552,597 B2 | 8/2013 | Song et al. |
| 8,558,661 B2 | 10/2013 | Zeine |
| 8,560,026 B2 | 10/2013 | Chanterac |
| 8,604,746 B2 | 12/2013 | Lee |
| 8,614,643 B2 | 12/2013 | Leabman |
| 8,621,245 B2 | 12/2013 | Shearer et al. |
| 8,626,249 B2 | 1/2014 | Kuusilinna et al. |
| 8,629,576 B2 | 1/2014 | Levine |
| 8,653,966 B2 | 2/2014 | Rao et al. |
| 8,674,551 B2 | 3/2014 | Low et al. |
| 8,686,685 B2 | 4/2014 | Moshfeghi |
| 8,712,355 B2 | 4/2014 | Black et al. |
| 8,712,485 B2 | 4/2014 | Tam |
| 8,718,773 B2 | 5/2014 | Wills et al. |
| 8,729,737 B2 | 5/2014 | Schatz et al. |
| 8,736,228 B1 | 5/2014 | Freed et al. |
| 8,760,113 B2 | 6/2014 | Keating |
| 8,770,482 B2 | 7/2014 | Ackermann et al. |
| 8,772,960 B2 | 7/2014 | Yoshida |
| 8,823,319 B2 | 9/2014 | Von Novak, III et al. |
| 8,854,176 B2 | 10/2014 | Zeine |
| 8,860,364 B2 | 10/2014 | Low et al. |
| 8,897,770 B1 | 11/2014 | Frolov et al. |
| 8,923,189 B2 | 12/2014 | Leabman |
| 8,928,544 B2 | 1/2015 | Massie et al. |
| 8,937,408 B2 | 1/2015 | Ganem et al. |
| 8,946,940 B2 | 2/2015 | Kim et al. |
| 8,963,486 B2 | 2/2015 | Kirby et al. |
| 8,970,070 B2 | 3/2015 | Sada et al. |
| 8,989,053 B1 | 3/2015 | Skaaksrud et al. |
| 9,000,616 B2 | 4/2015 | Greene et al. |
| 9,001,622 B2 | 4/2015 | Perry |
| 9,006,934 B2 | 4/2015 | Kozakai et al. |
| 9,021,277 B2 | 4/2015 | Shearer et al. |
| 9,030,161 B2 | 5/2015 | Lu et al. |
| 9,059,598 B2 | 6/2015 | Kang et al. |
| 9,059,599 B2 | 6/2015 | Won et al. |
| 9,077,188 B2 | 7/2015 | Moshfeghi |
| 9,088,216 B2 | 7/2015 | Garrity et al. |
| 9,124,125 B2 | 9/2015 | Leabman et al. |
| 9,130,397 B2 | 9/2015 | Leabman et al. |
| 9,130,602 B2 | 9/2015 | Cook |
| 9,142,998 B2 | 9/2015 | Yu et al. |
| 9,143,000 B2 | 9/2015 | Leabman et al. |
| 9,143,010 B2 | 9/2015 | Urano |
| 9,178,389 B2 | 11/2015 | Hwang |
| 9,225,196 B2 | 12/2015 | Huang et al. |
| 9,242,411 B2 | 1/2016 | Kritchman et al. |

(56) References Cited

U.S. PATENT DOCUMENTS

| | | |
|---|---|---|
| 9,244,500 B2 | 1/2016 | Cain et al. |
| 9,252,628 B2 | 2/2016 | Leabman et al. |
| 9,270,344 B2 | 2/2016 | Rosenberg |
| 9,282,582 B1 | 3/2016 | Dunsbergen et al. |
| 9,294,840 B1 | 3/2016 | Anderson et al. |
| 9,297,896 B1 | 3/2016 | Andrews |
| 9,318,898 B2 | 4/2016 | John |
| 9,368,020 B1 | 6/2016 | Bell et al. |
| 9,401,977 B1 | 7/2016 | Gaw |
| 9,438,045 B1 | 9/2016 | Leabman |
| 9,438,046 B1 | 9/2016 | Leabman |
| 9,444,283 B2 | 9/2016 | Son et al. |
| 9,450,449 B1 | 9/2016 | Leabman et al. |
| 9,461,502 B2 | 10/2016 | Lee et al. |
| 9,520,725 B2 | 12/2016 | Masaoka et al. |
| 9,520,748 B2 | 12/2016 | Hyde et al. |
| 9,522,270 B2 | 12/2016 | Perryman et al. |
| 9,537,354 B2 | 1/2017 | Bell et al. |
| 9,537,357 B2 | 1/2017 | Leabman |
| 9,537,358 B2 | 1/2017 | Leabman |
| 9,538,382 B2 | 1/2017 | Bell et al. |
| 9,544,640 B2 | 1/2017 | Lau |
| 9,559,553 B2 | 1/2017 | Bae |
| 9,564,773 B2 | 2/2017 | Pogorelik et al. |
| 9,571,974 B2 | 2/2017 | Choi et al. |
| 9,590,444 B2 | 3/2017 | Walley |
| 9,620,996 B2 | 4/2017 | Zeine |
| 2002/0001307 A1 | 1/2002 | Nguyen et al. |
| 2002/0028655 A1 | 3/2002 | Rosener et al. |
| 2002/0034958 A1 | 3/2002 | Oberschmidt et al. |
| 2002/0054330 A1 | 5/2002 | Jinbo et al. |
| 2002/0065052 A1 | 5/2002 | Pande et al. |
| 2002/0072784 A1 | 6/2002 | Sheppard et al. |
| 2002/0095980 A1 | 7/2002 | Breed et al. |
| 2002/0103447 A1 | 8/2002 | Terry |
| 2002/0133592 A1 | 9/2002 | Matsuda |
| 2002/0172223 A1 | 11/2002 | Stilp |
| 2003/0005759 A1 | 1/2003 | Breed et al. |
| 2003/0058187 A1 | 3/2003 | Billiet et al. |
| 2003/0076274 A1 | 4/2003 | Phelan et al. |
| 2003/0179152 A1 | 9/2003 | Watada et al. |
| 2003/0179573 A1 | 9/2003 | Chun |
| 2003/0192053 A1 | 10/2003 | Sheppard et al. |
| 2004/0019624 A1 | 1/2004 | Sukegawa |
| 2004/0020100 A1 | 2/2004 | O'Brien et al. |
| 2004/0036657 A1 | 2/2004 | Forster et al. |
| 2004/0066251 A1 | 4/2004 | Eleftheriades et al. |
| 2004/0107641 A1 | 6/2004 | Walton et al. |
| 2004/0113543 A1 | 6/2004 | Daniels |
| 2004/0119675 A1 | 6/2004 | Washio et al. |
| 2004/0130425 A1 | 7/2004 | Dayan et al. |
| 2004/0130442 A1 | 7/2004 | Breed |
| 2004/0142733 A1 | 7/2004 | Parise |
| 2004/0145342 A1 | 7/2004 | Lyon |
| 2004/0196190 A1* | 10/2004 | Mendolia ............... H01Q 1/085 343/700 MS |
| 2004/0207559 A1 | 10/2004 | Milosavljevic |
| 2004/0218759 A1 | 11/2004 | Yacobi |
| 2004/0259604 A1 | 12/2004 | Mickle et al. |
| 2004/0263124 A1 | 12/2004 | Wieck et al. |
| 2005/0007276 A1 | 1/2005 | Barrick et al. |
| 2005/0030118 A1 | 2/2005 | Wang |
| 2005/0046584 A1 | 3/2005 | Breed |
| 2005/0055316 A1 | 3/2005 | Williams |
| 2005/0093766 A1 | 5/2005 | Turner |
| 2005/0116683 A1 | 6/2005 | Cheng |
| 2005/0117660 A1 | 6/2005 | Vialle et al. |
| 2005/0171411 A1 | 8/2005 | Kenknight |
| 2005/0198673 A1 | 9/2005 | Kit et al. |
| 2005/0227619 A1 | 10/2005 | Lee et al. |
| 2005/0232469 A1 | 10/2005 | Schofield |
| 2005/0282591 A1 | 12/2005 | Shaff |
| 2006/0013335 A1 | 1/2006 | Leabman |
| 2006/0019712 A1 | 1/2006 | Choi |
| 2006/0030279 A1 | 2/2006 | Leabman et al. |
| 2006/0092079 A1 | 5/2006 | de Rochemont |
| 2006/0094425 A1 | 5/2006 | Mickle et al. |
| 2006/0113955 A1 | 6/2006 | Nunally |
| 2006/0119532 A1 | 6/2006 | Yun et al. |
| 2006/0136004 A1 | 6/2006 | Cowan et al. |
| 2006/0160517 A1 | 7/2006 | Yoon |
| 2006/0183473 A1 | 8/2006 | Ukon |
| 2006/0190063 A1 | 8/2006 | Kanzius |
| 2006/0192913 A1 | 8/2006 | Shutou et al. |
| 2006/0199620 A1 | 9/2006 | Greene et al. |
| 2006/0238365 A1 | 10/2006 | Vecchione et al. |
| 2006/0266564 A1 | 11/2006 | Perlman et al. |
| 2006/0266917 A1 | 11/2006 | Baldis et al. |
| 2006/0278706 A1 | 12/2006 | Hatakayama et al. |
| 2006/0284593 A1 | 12/2006 | Nagy et al. |
| 2006/0287094 A1 | 12/2006 | Mahaffey et al. |
| 2007/0007821 A1 | 1/2007 | Rossetti |
| 2007/0019693 A1 | 1/2007 | Graham |
| 2007/0021140 A1 | 1/2007 | Keyes |
| 2007/0060185 A1 | 3/2007 | Simon et al. |
| 2007/0070490 A1 | 3/2007 | Tsunoda et al. |
| 2007/0093269 A1 | 4/2007 | Leabman et al. |
| 2007/0097653 A1 | 5/2007 | Gilliland et al. |
| 2007/0103110 A1 | 5/2007 | Sagoo |
| 2007/0106894 A1 | 5/2007 | Zhang |
| 2007/0109121 A1 | 5/2007 | Cohen |
| 2007/0139000 A1 | 6/2007 | Kozuma |
| 2007/0149162 A1 | 6/2007 | Greene et al. |
| 2007/0173196 A1 | 7/2007 | Gallic |
| 2007/0173214 A1 | 7/2007 | Mickle et al. |
| 2007/0178857 A1 | 8/2007 | Greene et al. |
| 2007/0178945 A1 | 8/2007 | Cook et al. |
| 2007/0182367 A1 | 8/2007 | Partovi |
| 2007/0191074 A1 | 8/2007 | Harrist et al. |
| 2007/0191075 A1 | 8/2007 | Greene et al. |
| 2007/0197281 A1 | 8/2007 | Stronach |
| 2007/0210960 A1 | 9/2007 | Rofougaran et al. |
| 2007/0222681 A1 | 9/2007 | Greene et al. |
| 2007/0257634 A1 | 11/2007 | Leschin et al. |
| 2007/0273486 A1 | 11/2007 | Shiotsu |
| 2007/0298846 A1 | 12/2007 | Greene et al. |
| 2008/0014897 A1 | 1/2008 | Cook et al. |
| 2008/0048917 A1 | 2/2008 | Achour et al. |
| 2008/0062062 A1 | 3/2008 | Borau et al. |
| 2008/0062255 A1 | 3/2008 | Gal |
| 2008/0067874 A1 | 3/2008 | Tseng |
| 2008/0074324 A1 | 3/2008 | Puzella et al. |
| 2008/0089277 A1 | 4/2008 | Aledander et al. |
| 2008/0113816 A1 | 5/2008 | Mahaffey et al. |
| 2008/0122297 A1 | 5/2008 | Arai |
| 2008/0123383 A1 | 5/2008 | Shionoiri |
| 2008/0129536 A1 | 6/2008 | Randall et al. |
| 2008/0169910 A1 | 7/2008 | Greene et al. |
| 2008/0197802 A1 | 8/2008 | Onishi |
| 2008/0204342 A1 | 8/2008 | Kharadly |
| 2008/0204350 A1 | 8/2008 | Tam et al. |
| 2008/0210762 A1 | 9/2008 | Osada et al. |
| 2008/0211458 A1 | 9/2008 | Lawther et al. |
| 2008/0248758 A1 | 10/2008 | Schedelbeck et al. |
| 2008/0248846 A1 | 10/2008 | Stronach et al. |
| 2008/0278378 A1 | 11/2008 | Chang et al. |
| 2008/0309452 A1 | 12/2008 | Zeine |
| 2009/0002493 A1 | 1/2009 | Kates |
| 2009/0019183 A1 | 1/2009 | Wu et al. |
| 2009/0036065 A1 | 2/2009 | Siu |
| 2009/0047998 A1 | 2/2009 | Alberth, Jr. |
| 2009/0058354 A1 | 3/2009 | Harrison |
| 2009/0058361 A1 | 3/2009 | John |
| 2009/0067208 A1 | 3/2009 | Martin et al. |
| 2009/0096412 A1 | 4/2009 | Huang |
| 2009/0096413 A1 | 4/2009 | Partovi |
| 2009/0102292 A1 | 4/2009 | Cook et al. |
| 2009/0102296 A1 | 4/2009 | Greene et al. |
| 2009/0108679 A1 | 4/2009 | Porwal |
| 2009/0122847 A1 | 5/2009 | Nysen et al. |
| 2009/0128262 A1 | 5/2009 | Lee et al. |
| 2009/0157911 A1 | 6/2009 | Aihara |
| 2009/0200985 A1 | 8/2009 | Zane et al. |
| 2009/0206791 A1 | 8/2009 | Jung |

(56) References Cited

U.S. PATENT DOCUMENTS

| | | |
|---|---|---|
| 2009/0207092 A1 | 8/2009 | Nysen et al. |
| 2009/0218884 A1 | 9/2009 | Soar |
| 2009/0218891 A1 | 9/2009 | McCollough |
| 2009/0219903 A1 | 9/2009 | Alamouti et al. |
| 2009/0243397 A1 | 10/2009 | Cook et al. |
| 2009/0264069 A1 | 10/2009 | Yamasuge |
| 2009/0280866 A1 | 11/2009 | Lo et al. |
| 2009/0281678 A1 | 11/2009 | Wakamatsu |
| 2009/0284082 A1 | 11/2009 | Mohammadian |
| 2009/0284083 A1 | 11/2009 | Karalis et al. |
| 2009/0284220 A1 | 11/2009 | Toncich et al. |
| 2009/0284227 A1 | 11/2009 | Mohammadian et al. |
| 2009/0284325 A1 | 11/2009 | Rossiter et al. |
| 2009/0286475 A1 | 11/2009 | Toncich et al. |
| 2009/0291634 A1 | 11/2009 | Saarisalo |
| 2009/0299175 A1 | 12/2009 | Bernstein et al. |
| 2009/0312046 A1 | 12/2009 | Clevenger et al. |
| 2009/0315412 A1 | 12/2009 | Yamamoto et al. |
| 2009/0322281 A1 | 12/2009 | Kamijo et al. |
| 2010/0001683 A1 | 1/2010 | Huang et al. |
| 2010/0007307 A1 | 1/2010 | Baarman et al. |
| 2010/0007569 A1 | 1/2010 | Sim et al. |
| 2010/0019686 A1 | 1/2010 | Gutierrez, Jr. |
| 2010/0026605 A1 | 2/2010 | Yang et al. |
| 2010/0027379 A1 | 2/2010 | Saulnier et al. |
| 2010/0029383 A1 | 2/2010 | Dai |
| 2010/0033021 A1 | 2/2010 | Bennett |
| 2010/0033390 A1 | 2/2010 | Alamouti et al. |
| 2010/0034238 A1 | 2/2010 | Bennett |
| 2010/0041453 A1 | 2/2010 | Grimm, Jr. |
| 2010/0044123 A1 | 2/2010 | Perlman et al. |
| 2010/0054200 A1 | 3/2010 | Tsai |
| 2010/0060534 A1 | 3/2010 | Oodachi |
| 2010/0075607 A1 | 3/2010 | Hosoya |
| 2010/0079005 A1 | 4/2010 | Hyde et al. |
| 2010/0082193 A1 | 4/2010 | Chiappetta |
| 2010/0087227 A1 | 4/2010 | Francos et al. |
| 2010/0090524 A1 | 4/2010 | Obayashi |
| 2010/0090656 A1 | 4/2010 | Shearer et al. |
| 2010/0109443 A1 | 5/2010 | Cook et al. |
| 2010/0119234 A1 | 5/2010 | Suematsu et al. |
| 2010/0123618 A1 | 5/2010 | Martin et al. |
| 2010/0123624 A1 | 5/2010 | Minear et al. |
| 2010/0127660 A1 | 5/2010 | Cook et al. |
| 2010/0142418 A1 | 6/2010 | Nishioka et al. |
| 2010/0142509 A1 | 6/2010 | Zhu et al. |
| 2010/0151808 A1 | 6/2010 | Toncich et al. |
| 2010/0156721 A1 | 6/2010 | Alamouti et al. |
| 2010/0164433 A1 | 7/2010 | Janefalker et al. |
| 2010/0171461 A1 | 7/2010 | Baarman et al. |
| 2010/0174629 A1 | 7/2010 | Taylor et al. |
| 2010/0176934 A1 | 7/2010 | Chou et al. |
| 2010/0181961 A1 | 7/2010 | Novak et al. |
| 2010/0181964 A1 | 7/2010 | Huggins et al. |
| 2010/0194206 A1 | 8/2010 | Burdo et al. |
| 2010/0201189 A1 | 8/2010 | Kirby et al. |
| 2010/0201201 A1 | 8/2010 | Mobarhan et al. |
| 2010/0201314 A1 | 8/2010 | Toncich et al. |
| 2010/0207572 A1 | 8/2010 | Kirby et al. |
| 2010/0210233 A1 | 8/2010 | Cook et al. |
| 2010/0214177 A1 | 8/2010 | Parsche |
| 2010/0225270 A1 | 9/2010 | Jacobs et al. |
| 2010/0227570 A1 | 9/2010 | Hendin |
| 2010/0231470 A1 | 9/2010 | Lee et al. |
| 2010/0237709 A1 | 9/2010 | Hall et al. |
| 2010/0244576 A1 | 9/2010 | Hillan et al. |
| 2010/0256831 A1 | 10/2010 | Abramo et al. |
| 2010/0259110 A1 | 10/2010 | Kurs et al. |
| 2010/0259447 A1 | 10/2010 | Crouch |
| 2010/0264747 A1 | 10/2010 | Hall et al. |
| 2010/0277003 A1 | 11/2010 | Von Novak et al. |
| 2010/0277121 A1 | 11/2010 | Hall et al. |
| 2010/0279606 A1 | 11/2010 | Hillan et al. |
| 2010/0289341 A1 | 11/2010 | Ozaki et al. |
| 2010/0295372 A1 | 11/2010 | Hyde et al. |
| 2010/0308767 A1 | 12/2010 | Rofougaran et al. |
| 2010/0309079 A1 | 12/2010 | Rofougaran et al. |
| 2010/0309088 A1 | 12/2010 | Hyvonen et al. |
| 2010/0315045 A1 | 12/2010 | Zeine |
| 2010/0316163 A1 | 12/2010 | Forenza et al. |
| 2010/0327766 A1 | 12/2010 | Recker et al. |
| 2010/0328044 A1 | 12/2010 | Waffenschmidt et al. |
| 2010/0332401 A1 | 12/2010 | Prahlad et al. |
| 2011/0018360 A1 | 1/2011 | Baarman et al. |
| 2011/0028114 A1 | 2/2011 | Kerselaers |
| 2011/0031928 A1 | 2/2011 | Soar |
| 2011/0032149 A1 | 2/2011 | Leabman |
| 2011/0032866 A1 | 2/2011 | Leabman |
| 2011/0034190 A1 | 2/2011 | Leabman |
| 2011/0034191 A1 | 2/2011 | Leabman |
| 2011/0043047 A1 | 2/2011 | Karalis et al. |
| 2011/0043163 A1 | 2/2011 | Baarman et al. |
| 2011/0043327 A1 | 2/2011 | Baarman et al. |
| 2011/0050166 A1 | 3/2011 | Cook et al. |
| 2011/0055037 A1 | 3/2011 | Hayashigawa et al. |
| 2011/0056215 A1 | 3/2011 | Ham |
| 2011/0057607 A1 | 3/2011 | Carobolante |
| 2011/0062788 A1 | 3/2011 | Chen et al. |
| 2011/0074342 A1 | 3/2011 | MacLaughlin |
| 2011/0074349 A1 | 3/2011 | Ghovanloo |
| 2011/0074620 A1 | 3/2011 | Wintermantel |
| 2011/0078092 A1 | 3/2011 | Kim et al. |
| 2011/0090126 A1 | 4/2011 | Szini et al. |
| 2011/0114401 A1 | 5/2011 | Kanno et al. |
| 2011/0115303 A1 | 5/2011 | Baarman et al. |
| 2011/0115432 A1 | 5/2011 | El-Maleh |
| 2011/0115605 A1 | 5/2011 | Dimig et al. |
| 2011/0121660 A1 | 5/2011 | Azancot et al. |
| 2011/0122026 A1 | 5/2011 | DeLaquil et al. |
| 2011/0127845 A1 | 6/2011 | Walley et al. |
| 2011/0127952 A1 | 6/2011 | Walley et al. |
| 2011/0133655 A1 | 6/2011 | Recker et al. |
| 2011/0133691 A1 | 6/2011 | Hautanen |
| 2011/0148578 A1 | 6/2011 | Aloi et al. |
| 2011/0151789 A1 | 6/2011 | Viglione et al. |
| 2011/0154429 A1 | 6/2011 | Stantchev |
| 2011/0156494 A1 | 6/2011 | Mashinsky |
| 2011/0156640 A1 | 6/2011 | Moshfeghi |
| 2011/0163128 A1 | 7/2011 | Taguchi et al. |
| 2011/0175455 A1 | 7/2011 | Hashiguchi |
| 2011/0175461 A1 | 7/2011 | Tinaphong |
| 2011/0181120 A1 | 7/2011 | Liu et al. |
| 2011/0182245 A1 | 7/2011 | Malkamaki et al. |
| 2011/0184842 A1 | 7/2011 | Melen |
| 2011/0188207 A1 | 8/2011 | Won et al. |
| 2011/0194543 A1 | 8/2011 | Zhao et al. |
| 2011/0195722 A1 | 8/2011 | Walter et al. |
| 2011/0199046 A1 | 8/2011 | Tsai et al. |
| 2011/0215086 A1 | 9/2011 | Yeh |
| 2011/0217923 A1 | 9/2011 | Ma |
| 2011/0220634 A1 | 9/2011 | Yeh |
| 2011/0221389 A1 | 9/2011 | Won et al. |
| 2011/0222272 A1 | 9/2011 | Yeh |
| 2011/0243040 A1 | 10/2011 | Khan et al. |
| 2011/0243050 A1 | 10/2011 | Yanover |
| 2011/0244913 A1 | 10/2011 | Kim et al. |
| 2011/0248573 A1 | 10/2011 | Kanno et al. |
| 2011/0248575 A1 | 10/2011 | Kim et al. |
| 2011/0249678 A1 | 10/2011 | Bonicatto |
| 2011/0254377 A1 | 10/2011 | Widmer et al. |
| 2011/0254503 A1 | 10/2011 | Widmer et al. |
| 2011/0259953 A1 | 10/2011 | Baarman et al. |
| 2011/0273977 A1 | 11/2011 | Shapira et al. |
| 2011/0278941 A1 | 11/2011 | Krishna et al. |
| 2011/0279226 A1 | 11/2011 | Chen et al. |
| 2011/0281535 A1 | 11/2011 | Low et al. |
| 2011/0282415 A1 | 11/2011 | Eckhoff et al. |
| 2011/0285213 A1 | 11/2011 | Kowalewski |
| 2011/0286374 A1 | 11/2011 | Shin et al. |
| 2011/0291489 A1 | 12/2011 | Tsai et al. |
| 2011/0302078 A1 | 12/2011 | Failing |
| 2011/0304216 A1 | 12/2011 | Baarman |
| 2011/0304437 A1 | 12/2011 | Beeler |
| 2012/0013196 A1 | 1/2012 | Kim et al. |

(56) References Cited

U.S. PATENT DOCUMENTS

| | | |
|---|---|---|
| 2012/0013198 A1 | 1/2012 | Uramoto et al. |
| 2012/0013296 A1 | 1/2012 | Heydari et al. |
| 2012/0019419 A1 | 1/2012 | Prat et al. |
| 2012/0043887 A1 | 2/2012 | Mesibov |
| 2012/0051109 A1 | 3/2012 | Kim et al. |
| 2012/0051294 A1 | 3/2012 | Guillouard |
| 2012/0056486 A1 | 3/2012 | Endo et al. |
| 2012/0056741 A1 | 3/2012 | Zhu et al. |
| 2012/0074891 A1 | 3/2012 | Anderson et al. |
| 2012/0231856 A1 | 3/2012 | Lee et al. |
| 2012/0080957 A1 | 4/2012 | Cooper et al. |
| 2012/0086284 A1 | 4/2012 | Capanella et al. |
| 2012/0095617 A1 | 4/2012 | Martin et al. |
| 2012/0098350 A1 | 4/2012 | Campanella et al. |
| 2012/0098485 A1 | 4/2012 | Kang et al. |
| 2012/0099675 A1 | 4/2012 | Kitamura et al. |
| 2012/0103562 A1 | 5/2012 | Clayton |
| 2012/0104849 A1 | 5/2012 | Jackson |
| 2012/0105252 A1 | 5/2012 | Wang |
| 2012/0112532 A1 | 5/2012 | Kesler et al. |
| 2012/0119914 A1 | 5/2012 | Uchida |
| 2012/0126743 A1 | 5/2012 | Rivers, Jr. |
| 2012/0132647 A1 | 5/2012 | Beverly et al. |
| 2012/0133214 A1 | 5/2012 | Yun et al. |
| 2012/0146426 A1 | 6/2012 | Sabo |
| 2012/0146576 A1 | 6/2012 | Partovi |
| 2012/0146577 A1 | 6/2012 | Tanabe |
| 2012/0147802 A1 | 6/2012 | Ukita et al. |
| 2012/0149307 A1 | 6/2012 | Terada et al. |
| 2012/0150670 A1 | 6/2012 | Taylor et al. |
| 2012/0153894 A1 | 6/2012 | Widmer et al. |
| 2012/0157019 A1 | 6/2012 | Li |
| 2012/0161531 A1 | 6/2012 | Kim et al. |
| 2012/0161544 A1 | 6/2012 | Kashiwagi et al. |
| 2012/0169276 A1 | 7/2012 | Wang |
| 2012/0169278 A1 | 7/2012 | Choi |
| 2012/0173418 A1 | 7/2012 | Beardsmore et al. |
| 2012/0179004 A1 | 7/2012 | Roesicke et al. |
| 2012/0181973 A1 | 7/2012 | Lyden |
| 2012/0182427 A1 | 7/2012 | Marshall |
| 2012/0187851 A1 | 8/2012 | Huggins et al. |
| 2012/0193999 A1 | 8/2012 | Zeine |
| 2012/0201153 A1 | 8/2012 | Bharadia et al. |
| 2012/0201173 A1 | 8/2012 | Jian et al. |
| 2012/0206299 A1 | 8/2012 | Valdes-Garcia |
| 2012/0212072 A1 | 8/2012 | Miyabayashi et al. |
| 2012/0214536 A1 | 8/2012 | Kim et al. |
| 2012/0200399 A1 | 9/2012 | Chae |
| 2012/0228956 A1 | 9/2012 | Kamata |
| 2012/0235636 A1 | 9/2012 | Partovi |
| 2012/0242283 A1 | 9/2012 | Kim et al. |
| 2012/0248886 A1 | 10/2012 | Kesler et al. |
| 2012/0248888 A1 | 10/2012 | Kesler et al. |
| 2012/0248891 A1 | 10/2012 | Drennen |
| 2012/0249051 A1 | 10/2012 | Son et al. |
| 2012/0262002 A1 | 10/2012 | Widmer et al. |
| 2012/0265272 A1 | 10/2012 | Judkins |
| 2012/0267900 A1 | 10/2012 | Huffman et al. |
| 2012/0268238 A1 | 10/2012 | Park et al. |
| 2012/0274154 A1 | 11/2012 | DeLuca |
| 2012/0280650 A1 | 11/2012 | Kim et al. |
| 2012/0286582 A1 | 11/2012 | Kim et al. |
| 2012/0292993 A1 | 11/2012 | Mettler et al. |
| 2012/0293021 A1 | 11/2012 | Teggatz et al. |
| 2012/0293119 A1 | 11/2012 | Park et al. |
| 2012/0299389 A1 | 11/2012 | Lee et al. |
| 2012/0299540 A1 | 11/2012 | Perry |
| 2012/0299541 A1 | 11/2012 | Perry |
| 2012/0299542 A1 | 11/2012 | Perry |
| 2012/0300588 A1 | 11/2012 | Perry |
| 2012/0300592 A1 | 11/2012 | Perry |
| 2012/0300593 A1 | 11/2012 | Perry |
| 2012/0306705 A1 | 12/2012 | Sakurai et al. |
| 2012/0309295 A1 | 12/2012 | Maguire |
| 2012/0309308 A1 | 12/2012 | Kim et al. |
| 2012/0309332 A1 | 12/2012 | Liao |
| 2012/0313449 A1 | 12/2012 | Kurs |
| 2012/0326660 A1 | 12/2012 | Lu et al. |
| 2013/0002550 A1 | 1/2013 | Zalewski |
| 2013/0024059 A1 | 1/2013 | Miller et al. |
| 2013/0026981 A1 | 1/2013 | Van Der Lee |
| 2013/0026982 A1 | 1/2013 | Rothenbaum |
| 2013/0032589 A1 | 2/2013 | Chung |
| 2013/0033571 A1 | 2/2013 | Steen |
| 2013/0038124 A1 | 2/2013 | Newdoll et al. |
| 2013/0038402 A1 | 2/2013 | Karalis et al. |
| 2013/0043738 A1 | 2/2013 | Park et al. |
| 2013/0049471 A1 | 2/2013 | Oleynik |
| 2013/0049475 A1 | 2/2013 | Kim et al. |
| 2013/0057078 A1 | 3/2013 | Lee |
| 2013/0057205 A1 | 3/2013 | Lee et al. |
| 2013/0057210 A1 | 3/2013 | Negaard et al. |
| 2013/0057364 A1 | 3/2013 | Kesler et al. |
| 2013/0063082 A1 | 3/2013 | Lee et al. |
| 2013/0063143 A1 | 3/2013 | Adalsteinsson et al. |
| 2013/0069444 A1 | 3/2013 | Waffenschmidt et al. |
| 2013/0077650 A1 | 3/2013 | Traxler et al. |
| 2013/0078918 A1 | 3/2013 | Crowley et al. |
| 2013/0082651 A1 | 4/2013 | Park et al. |
| 2013/0082653 A1 | 4/2013 | Lee et al. |
| 2013/0083774 A1 | 4/2013 | Son et al. |
| 2013/0088082 A1 | 4/2013 | Kang et al. |
| 2013/0088090 A1 | 4/2013 | Wu |
| 2013/0088192 A1 | 4/2013 | Eaton |
| 2013/0088331 A1 | 4/2013 | Cho |
| 2013/0093388 A1 | 4/2013 | Partovi |
| 2013/0099389 A1 | 4/2013 | Hong et al. |
| 2013/0099586 A1 | 4/2013 | Kato |
| 2013/0106197 A1 | 5/2013 | Bae et al. |
| 2013/0107023 A1 | 5/2013 | Tanaka et al. |
| 2013/0119777 A1 | 5/2013 | Rees |
| 2013/0119929 A1 | 5/2013 | Partovi |
| 2013/0120217 A1 | 5/2013 | Ueda et al. |
| 2013/0132010 A1 | 5/2013 | Winger et al. |
| 2013/0134923 A1 | 5/2013 | Smith |
| 2013/0137455 A1 | 5/2013 | Xia |
| 2013/0141037 A1 | 6/2013 | Jenwatanavet et al. |
| 2013/0148341 A1 | 6/2013 | Williams |
| 2013/0149975 A1 | 6/2013 | Yu et al. |
| 2013/0154387 A1 | 6/2013 | Lee et al. |
| 2013/0155748 A1 | 6/2013 | Sundstrom |
| 2013/0157729 A1 | 6/2013 | Tabe |
| 2013/0169061 A1 | 7/2013 | Microshnichenko et al. |
| 2013/0169219 A1 | 7/2013 | Gray |
| 2013/0169348 A1 | 7/2013 | Shi |
| 2013/0171939 A1 | 7/2013 | Tian et al. |
| 2013/0178253 A1 | 7/2013 | Karaoguz |
| 2013/0181881 A1 | 7/2013 | Christie et al. |
| 2013/0190031 A1 | 7/2013 | Persson et al. |
| 2013/0193769 A1 | 8/2013 | Mehta et al. |
| 2013/0197320 A1 | 8/2013 | Albert et al. |
| 2013/0200064 A1 | 8/2013 | Alexander |
| 2013/0207477 A1 | 8/2013 | Nam et al. |
| 2013/0207604 A1 | 8/2013 | Zeine |
| 2013/0210357 A1 | 8/2013 | Qin et al. |
| 2013/0221757 A1 | 8/2013 | Cho et al. |
| 2013/0234530 A1 | 9/2013 | Miyauchi |
| 2013/0234536 A1 | 9/2013 | Chemishkian et al. |
| 2013/0234658 A1 | 9/2013 | Endo et al. |
| 2013/0241306 A1 | 9/2013 | Aber et al. |
| 2013/0241468 A1 | 9/2013 | Moshfeghi |
| 2013/0241474 A1 | 9/2013 | Moshfeghi |
| 2013/0249478 A1 | 9/2013 | Hirano |
| 2013/0249479 A1 | 9/2013 | Partovi |
| 2013/0254578 A1 | 9/2013 | Huang et al. |
| 2013/0264997 A1 | 10/2013 | Lee et al. |
| 2013/0268782 A1 | 10/2013 | Tam et al. |
| 2013/0270923 A1 | 10/2013 | Cook et al. |
| 2013/0278209 A1 | 10/2013 | Von Novak |
| 2013/0285477 A1 | 10/2013 | Lo et al. |
| 2013/0285606 A1 | 10/2013 | Ben-Shalom et al. |
| 2013/0288600 A1 | 10/2013 | Kuusilinna et al. |
| 2013/0293423 A1 | 11/2013 | Moshfeghi |
| 2013/0310020 A1 | 11/2013 | Kazuhiro |

(56) References Cited

U.S. PATENT DOCUMENTS

| | | |
|---|---|---|
| 2013/0311798 A1 | 11/2013 | Sultenfuss |
| 2013/0328417 A1 | 12/2013 | Takeuchi |
| 2013/0334883 A1 | 12/2013 | Kim et al. |
| 2013/0339108 A1 | 12/2013 | Ryder et al. |
| 2013/0343251 A1 | 12/2013 | Zhang |
| 2014/0001846 A1 | 1/2014 | Mosebrook |
| 2014/0001875 A1 | 1/2014 | Nahidipour |
| 2014/0001876 A1 | 1/2014 | Fujiwara et al. |
| 2014/0006017 A1 | 1/2014 | Sen |
| 2014/0008992 A1 | 1/2014 | Leabman |
| 2014/0008993 A1 | 1/2014 | Leabman |
| 2014/0009108 A1 | 1/2014 | Leabman |
| 2014/0009110 A1 | 1/2014 | Lee |
| 2014/0011531 A1 | 1/2014 | Burstrom et al. |
| 2014/0015336 A1 | 1/2014 | Weber et al. |
| 2014/0015344 A1 | 1/2014 | Mohamadi |
| 2014/0021907 A1 | 1/2014 | Yu et al. |
| 2014/0021908 A1 | 1/2014 | McCool |
| 2014/0035524 A1 | 2/2014 | Zeine |
| 2014/0035526 A1 | 2/2014 | Tripathi et al. |
| 2014/0043248 A1 | 2/2014 | Yeh |
| 2014/0049422 A1 | 2/2014 | Von Novak et al. |
| 2014/0054971 A1 | 2/2014 | Kissin |
| 2014/0055098 A1 | 2/2014 | Lee et al. |
| 2014/0057618 A1 | 2/2014 | Zirwas et al. |
| 2014/0062395 A1 | 3/2014 | Kwon et al. |
| 2014/0082435 A1 | 3/2014 | Kitgawa |
| 2014/0086125 A1 | 3/2014 | Polo et al. |
| 2014/0086592 A1 | 3/2014 | Nakahara et al. |
| 2014/0091756 A1 | 4/2014 | Ofstein et al. |
| 2014/0091968 A1 | 4/2014 | Harel et al. |
| 2014/0103869 A1 | 4/2014 | Radovic |
| 2014/0111147 A1 | 4/2014 | Soar |
| 2014/0113689 A1 | 4/2014 | Lee |
| 2014/0117946 A1 | 5/2014 | Muller et al. |
| 2014/0118140 A1 | 5/2014 | Amis |
| 2014/0132210 A1 | 5/2014 | Partovi |
| 2014/0133279 A1 | 5/2014 | Khuri-Yakub |
| 2014/0139034 A1 | 5/2014 | Sankar et al. |
| 2014/0139039 A1 | 5/2014 | Cook et al. |
| 2014/0139180 A1 | 5/2014 | Kim et al. |
| 2014/0141838 A1 | 5/2014 | Cai et al. |
| 2014/0142876 A1 | 5/2014 | John et al. |
| 2014/0143933 A1 | 5/2014 | Low et al. |
| 2014/0145879 A1 | 5/2014 | Pan |
| 2014/0152117 A1 | 6/2014 | Sanker |
| 2014/0159651 A1 | 6/2014 | Von Novak et al. |
| 2014/0159652 A1 | 6/2014 | Hall et al. |
| 2014/0159662 A1 | 6/2014 | Furui |
| 2014/0159667 A1 | 6/2014 | Kim et al. |
| 2014/0175893 A1 | 6/2014 | Sengupta et al. |
| 2014/0176054 A1 | 6/2014 | Porat et al. |
| 2014/0177399 A1 | 6/2014 | Teng et al. |
| 2014/0184148 A1 | 7/2014 | Van Der Lee et al. |
| 2014/0184155 A1 | 7/2014 | Cha |
| 2014/0184163 A1 | 7/2014 | Das et al. |
| 2014/0184170 A1 | 7/2014 | Jeong |
| 2014/0191568 A1 | 7/2014 | Partovi |
| 2014/0194092 A1 | 7/2014 | Wanstedt et al. |
| 2014/0194095 A1 | 7/2014 | Wanstedt et al. |
| 2014/0206384 A1 | 7/2014 | Kim et al. |
| 2014/0210281 A1 | 7/2014 | Ito et al. |
| 2014/0217955 A1 | 8/2014 | Lin |
| 2014/0217967 A1 | 8/2014 | Zeine et al. |
| 2014/0225805 A1 | 8/2014 | Pan et al. |
| 2014/0232320 A1 | 8/2014 | Ento July et al. |
| 2014/0239733 A1 | 8/2014 | Mach et al. |
| 2014/0241231 A1 | 8/2014 | Zeine |
| 2014/0245036 A1 | 8/2014 | Oishi |
| 2014/0246416 A1 | 9/2014 | White |
| 2014/0247152 A1 | 9/2014 | Proud |
| 2014/0252813 A1 | 9/2014 | Lee et al. |
| 2014/0252866 A1 | 9/2014 | Walsh et al. |
| 2014/0265725 A1 | 9/2014 | Angle et al. |
| 2014/0265727 A1 | 9/2014 | Berte |
| 2014/0265943 A1 | 9/2014 | Angle et al. |
| 2014/0266025 A1 | 9/2014 | Jakubowski |
| 2014/0273892 A1 | 9/2014 | Nourbakhsh |
| 2014/0281655 A1 | 9/2014 | Angle et al. |
| 2014/0292090 A1 | 10/2014 | Cordeiro et al. |
| 2014/0312706 A1 | 10/2014 | Fiorello et al. |
| 2014/0325218 A1 | 10/2014 | Shimizu et al. |
| 2014/0327320 A1 | 11/2014 | Muhs et al. |
| 2014/0327390 A1 | 11/2014 | Park et al. |
| 2014/0346860 A1 | 11/2014 | Aubry et al. |
| 2014/0354063 A1 | 12/2014 | Leabman et al. |
| 2014/0354221 A1 | 12/2014 | Leabman et al. |
| 2014/0355718 A1 | 12/2014 | Guan et al. |
| 2014/0357309 A1 | 12/2014 | Leabman et al. |
| 2014/0368048 A1 | 12/2014 | Leabman |
| 2014/0368161 A1 | 12/2014 | Leabman et al. |
| 2014/0375253 A1 | 12/2014 | Leabman et al. |
| 2014/0375255 A1 | 12/2014 | Leabman et al. |
| 2014/0375258 A1 | 12/2014 | Arkhipenkov |
| 2014/0375261 A1 | 12/2014 | Manova-Elssibony et al. |
| 2014/0376646 A1 | 12/2014 | Leabman et al. |
| 2015/0001949 A1 | 1/2015 | Leabman et al. |
| 2015/0002086 A1 | 1/2015 | Matos et al. |
| 2015/0003207 A1 | 1/2015 | Lee et al. |
| 2015/0008980 A1 | 1/2015 | Kim et al. |
| 2015/0011160 A1 | 1/2015 | Uurgovan et al. |
| 2015/0015180 A1 | 1/2015 | Miller et al. |
| 2015/0015182 A1 | 1/2015 | Brandtman et al. |
| 2015/0015192 A1 | 1/2015 | Leabman et al. |
| 2015/0015194 A1 | 1/2015 | Leabman et al. |
| 2015/0015195 A1 | 1/2015 | Leabman et al. |
| 2015/0021990 A1 | 1/2015 | Myer et al. |
| 2015/0022008 A1 | 1/2015 | Leabman et al. |
| 2015/0022009 A1 | 1/2015 | Leabman et al. |
| 2015/0022010 A1 | 1/2015 | Leabman et al. |
| 2015/0023204 A1 | 1/2015 | Wil et al. |
| 2015/0028688 A1 | 1/2015 | Masaoka |
| 2015/0028694 A1 | 1/2015 | Leabman et al. |
| 2015/0028697 A1 | 1/2015 | Leabman et al. |
| 2015/0029397 A1 | 1/2015 | Leabman et al. |
| 2015/0035715 A1 | 2/2015 | Kim et al. |
| 2015/0041459 A1 | 2/2015 | Leabman et al. |
| 2015/0042264 A1 | 2/2015 | Leabman et al. |
| 2015/0042265 A1 | 2/2015 | Leabman et al. |
| 2015/0044977 A1 | 2/2015 | Ramasamy et al. |
| 2015/0046526 A1 | 2/2015 | Bush et al. |
| 2015/0061404 A1 | 3/2015 | Lamenza et al. |
| 2015/0076917 A1 | 3/2015 | Leabman et al. |
| 2015/0076927 A1 | 3/2015 | Leabman et al. |
| 2015/0077036 A1 | 3/2015 | Leabman et al. |
| 2015/0077037 A1 | 3/2015 | Leabman et al. |
| 2015/0091520 A1 | 4/2015 | Blum et al. |
| 2015/0097663 A1 | 4/2015 | Sloo et al. |
| 2015/0102681 A1 | 4/2015 | Leabman et al. |
| 2015/0102764 A1 | 4/2015 | Leabman et al. |
| 2015/0102769 A1 | 4/2015 | Leabman et al. |
| 2015/0108848 A1 | 4/2015 | Joehren |
| 2015/0115877 A1 | 4/2015 | Aria et al. |
| 2015/0115878 A1 | 4/2015 | Park |
| 2015/0123483 A1 | 5/2015 | Leabman et al. |
| 2015/0123496 A1 | 5/2015 | Leabman et al. |
| 2015/0128733 A1 | 5/2015 | Taylor et al. |
| 2015/0130285 A1 | 5/2015 | Leabman et al. |
| 2015/0130293 A1 | 5/2015 | Hajimiri et al. |
| 2015/0148664 A1 | 5/2015 | Stolka et al. |
| 2015/0155737 A1 | 6/2015 | Mayo |
| 2015/0155738 A1 | 6/2015 | Leabman et al. |
| 2015/0162751 A1 | 6/2015 | Leabman et al. |
| 2015/0162779 A1 | 6/2015 | Lee et al. |
| 2015/0171656 A1 | 6/2015 | Leabman et al. |
| 2015/0171658 A1 | 6/2015 | Manova-Elssibony et al. |
| 2015/0171931 A1 | 6/2015 | Won et al. |
| 2015/0177326 A1 | 6/2015 | Chakraborty et al. |
| 2015/0180133 A1 | 6/2015 | Hunt |
| 2015/0188352 A1 | 7/2015 | Peek et al. |
| 2015/0199665 A1 | 7/2015 | Chu |
| 2015/0207333 A1 | 7/2015 | Baarman et al. |
| 2015/0207542 A1 | 7/2015 | Zeine |
| 2015/0222126 A1 | 8/2015 | Leabman et al. |

(56) References Cited

U.S. PATENT DOCUMENTS

| | | |
|---|---|---|
| 2015/0236520 A1 | 8/2015 | Baarman |
| 2015/0244187 A1 | 8/2015 | Horie |
| 2015/0244201 A1 | 8/2015 | Chu |
| 2015/0244341 A1 | 8/2015 | Ritter et al. |
| 2015/0249484 A1 | 9/2015 | Mach et al. |
| 2015/0255989 A1 | 9/2015 | Walley et al. |
| 2015/0263534 A1 | 9/2015 | Lee et al. |
| 2015/0263548 A1 | 9/2015 | Cooper |
| 2015/0270741 A1 | 9/2015 | Leabman et al. |
| 2015/0280484 A1 | 10/2015 | Radziemski et al. |
| 2015/0288438 A1 | 10/2015 | Maltsev et al. |
| 2015/0318729 A1 | 11/2015 | Leabman |
| 2015/0326024 A1 | 11/2015 | Bell et al. |
| 2015/0326025 A1 | 11/2015 | Bell et al. |
| 2015/0326063 A1 | 11/2015 | Leabman et al. |
| 2015/0326068 A1 | 11/2015 | Bell et al. |
| 2015/0326069 A1 | 11/2015 | Petras et al. |
| 2015/0326070 A1 | 11/2015 | Petras et al. |
| 2015/0326072 A1 | 11/2015 | Petras et al. |
| 2015/0326142 A1 | 11/2015 | Petras et al. |
| 2015/0326143 A1 | 11/2015 | Petras et al. |
| 2015/0333528 A1 | 11/2015 | Leabman |
| 2015/0333529 A1 | 11/2015 | Leabman |
| 2015/0333573 A1 | 11/2015 | Leabman |
| 2015/0333800 A1 | 11/2015 | Perry et al. |
| 2015/0340759 A1 | 11/2015 | Bridgelall et al. |
| 2015/0340903 A1 | 11/2015 | Bell et al. |
| 2015/0340909 A1 | 11/2015 | Bell et al. |
| 2015/0340910 A1 | 11/2015 | Petras et al. |
| 2015/0340911 A1 | 11/2015 | Bell et al. |
| 2015/0341087 A1 | 11/2015 | Moore et al. |
| 2015/0349574 A1 | 12/2015 | Leabman |
| 2015/0358222 A1 | 12/2015 | Berger et al. |
| 2015/0365138 A1 | 12/2015 | Miller et al. |
| 2016/0005068 A1 | 1/2016 | Im et al. |
| 2016/0012695 A1 | 1/2016 | Bell et al. |
| 2016/0013656 A1 | 1/2016 | Bell et al. |
| 2016/0013677 A1 | 1/2016 | Bell et al. |
| 2016/0013678 A1 | 1/2016 | Bell et al. |
| 2016/0013855 A1 | 1/2016 | Campos |
| 2016/0020636 A1 | 1/2016 | Khlat |
| 2016/0020649 A1 | 1/2016 | Bell et al. |
| 2016/0020830 A1 | 1/2016 | Bell et al. |
| 2016/0042206 A1 | 2/2016 | Pesavento et al. |
| 2016/0054395 A1 | 2/2016 | Bell et al. |
| 2016/0054396 A1 | 2/2016 | Bell et al. |
| 2016/0054440 A1 | 2/2016 | Younis |
| 2016/0056635 A1 | 2/2016 | Bell |
| 2016/0056640 A1 | 2/2016 | Mao |
| 2016/0056669 A1 | 2/2016 | Bell |
| 2016/0056966 A1 | 2/2016 | Bell |
| 2016/0065005 A1 | 3/2016 | Won et al. |
| 2016/0079799 A1 | 3/2016 | Khlat |
| 2016/0094092 A1 | 3/2016 | Davlantes et al. |
| 2016/0099601 A1 | 4/2016 | Leabman et al. |
| 2016/0099602 A1 | 4/2016 | Leabman et al. |
| 2016/0099609 A1 | 4/2016 | Leabman et al. |
| 2016/0099610 A1 | 4/2016 | Leabman et al. |
| 2016/0099611 A1 | 4/2016 | Leabman et al. |
| 2016/0099612 A1 | 4/2016 | Leabman et al. |
| 2016/0099613 A1 | 4/2016 | Leabman et al. |
| 2016/0099614 A1 | 4/2016 | Leabman et al. |
| 2016/0099755 A1 | 4/2016 | Leabman et al. |
| 2016/0099756 A1 | 4/2016 | Leabman et al. |
| 2016/0099757 A1 | 4/2016 | Leabman et al. |
| 2016/0099758 A1 | 4/2016 | Leabman et al. |
| 2016/0100124 A1 | 4/2016 | Leabman et al. |
| 2016/0100312 A1 | 4/2016 | Bell et al. |
| 2016/0126752 A1 | 5/2016 | Vuori et al. |
| 2016/0126776 A1 | 5/2016 | Kim et al. |
| 2016/0141908 A1 | 5/2016 | Jakl et al. |
| 2016/0164563 A1 | 6/2016 | Khawand et al. |
| 2016/0181854 A1 | 6/2016 | Leabman |
| 2016/0181867 A1 | 6/2016 | Daniel et al. |
| 2016/0181873 A1 | 6/2016 | Mitcheson et al. |
| 2016/0191121 A1 | 6/2016 | Bell |
| 2016/0204622 A1 | 7/2016 | Leabman |
| 2016/0204642 A1 | 7/2016 | Oh |
| 2016/0238365 A1 | 8/2016 | Wixey et al. |
| 2016/0299210 A1 | 10/2016 | Zeine |
| 2016/0323000 A1 | 11/2016 | Liu et al. |
| 2016/0336804 A1 | 11/2016 | Son et al. |
| 2016/0339258 A1 | 11/2016 | Perryman et al. |
| 2016/0359367 A1 | 12/2016 | Rothschild |
| 2017/0005516 A9 | 1/2017 | Leabman et al. |
| 2017/0005530 A1 | 1/2017 | Zeine et al. |
| 2017/0025903 A1 | 1/2017 | Song et al. |
| 2017/0026087 A1 | 1/2017 | Tanabe |
| 2017/0043675 A1 | 2/2017 | Jones et al. |
| 2017/0047784 A1 | 2/2017 | Jung et al. |
| 2017/0077735 A1 | 3/2017 | Leabman |
| 2017/0077736 A1 | 3/2017 | Leabman |
| 2017/0077764 A1 | 3/2017 | Bell et al. |
| 2017/0077765 A1 | 3/2017 | Bell et al. |
| 2017/0077995 A1 | 3/2017 | Leabman |
| 2017/0085120 A1 | 3/2017 | Leabman et al. |
| 2017/0085437 A1 | 3/2017 | Condeixa et al. |
| 2017/0092115 A1 | 3/2017 | Sloo et al. |
| 2017/0110887 A1 | 4/2017 | Bell et al. |
| 2017/0134686 A9 | 5/2017 | Leabman |
| 2017/0163076 A1 | 6/2017 | Park et al. |
| 2017/0179763 A9 | 6/2017 | Leabman |

FOREIGN PATENT DOCUMENTS

| | | |
|---|---|---|
| EP | 1028482 A2 | 8/2000 |
| EP | 1081506 A1 | 3/2001 |
| EP | 2397973 A1 | 6/2010 |
| EP | 2346136 A1 | 7/2011 |
| EP | 2545635 A2 | 1/2013 |
| JP | 2006157586 A | 6/2006 |
| JP | 2007043432 A | 2/2007 |
| JP | 2008167017 A | 7/2008 |
| KR | 20060061776 A | 6/2006 |
| KR | 20070044302 A | 4/2007 |
| KR | 100755144 B1 | 9/2007 |
| KR | 20110132059 A | 12/2011 |
| KR | 20110135540 A1 | 12/2011 |
| KR | 20120009843 A | 2/2012 |
| KR | 20120108759 A | 10/2012 |
| KR | 20130026977 A | 3/2013 |
| WO | WO 9952173 | 10/1999 |
| WO | WO 200111716 A1 | 2/2001 |
| WO | WO 2004077550 A1 | 9/2004 |
| WO | WO 2003 091943 A1 | 11/2006 |
| WO | WO 2006122783 | 11/2006 |
| WO | WO 2008156571 A2 | 12/2008 |
| WO | WO 2010022181 A1 | 2/2010 |
| WO | WO 2010039246 A1 | 4/2010 |
| WO | WO 2010138994 A1 | 12/2010 |
| WO | WO 2011112022 A2 | 9/2011 |
| WO | WO 2012177283 A1 | 12/2012 |
| WO | WO 2013031988 A1 | 3/2013 |
| WO | WO 2013035190 A1 | 3/2013 |
| WO | WO 2013038074 A2 | 3/2013 |
| WO | WO 2013042399 A1 | 3/2013 |
| WO | WO 2013052950 A1 | 4/2013 |
| WO | WO 2013105920 A2 | 7/2013 |
| WO | WO 2014075103 A1 | 5/2014 |
| WO | WO 2014132258 A1 | 9/2014 |
| WO | WO 2014182788 A2 | 11/2014 |
| WO | WO 2014182788 A3 | 11/2014 |
| WO | WO 2014197472 A1 | 12/2014 |
| WO | WO 2014209587 A1 | 12/2014 |
| WO | WO 2015038773 A1 | 3/2015 |
| WO | WO 2015097809 A1 | 7/2015 |
| WO | WO 2015161323 A1 | 10/2015 |
| WO | WO 2016048512 A1 | 3/2016 |
| WO | WO 2016187357 A1 | 11/2016 |

(56) References Cited

OTHER PUBLICATIONS

Energous Corp., IPRP, PCT/US2014/037170, Nov. 10, 2015, 8 pgs.
Energous Corp., ISRWO, PCT/US2014/041534, Oct. 13, 2014, 10 pgs.
Energous Corp., IPRP, PCT/US2014/041534, Dec. 29, 2015, 7 pgs.
Energous Corp., ISRWO, PCT/US2014/046956, Nov. 12, 2014, 10 pgs.
Energous Corp., IPRP, PCT/US2014/046956, Jan. 19, 2016, 7 pgs.
Energous Corp., ISRWO, PCT/US2014/037072, Sep. 12, 2014, 8 pgs.
Energous Corp., IPRP, PCT/US2014/037072, Nov. 10, 2015, 6 pgs.
Energous Corp., ISRWO, PCT/US2014/068568, Mar. 20, 2015, 10 pgs.
Energous Corp., IPRP, PCT/US2014/068568, Jun. 14, 2016, 8 pgs.
Energous Corp., ISRWO, PCT/US2014/055195, Dec. 22, 2014, 11 pgs.
Energous Corp., IPRP, PCT/US2014/055195, Mar. 22, 2016, 9 pgs.
Energous Corp., ISRWO, PCT/US2015/067291, Mar. 4, 2016, 10 pgs.
Energous Corp., IPRP, PCT/US2015/067291, Jul. 4, 2017, 4 pgs.
Energous Corp., ISRWO, PCT/US2015/067242, Mar. 16, 2016, 9 pgs.
Energous Corp., IPRP, PCT/US2015/067242, Jun. 27, 2017, 7 pgs.
Energous Corp., ISRWO, PCT/US2015/067243, Mar. 10, 2016, 11 pgs.
Energous Corp., IPRP, PCT/US2015/067243, Jun. 27, 2017, 7 pgs.
Energous Corp., ISRWO, PCT/US2014/037109, Apr. 8, 2016, 12 pgs.
Energous Corp., IPRP, PCT/US2014/037109, Apr. 12, 2016, 9 pgs.
Energous Corp., ISRWO, PCT/US2015/067275, Mar. 3, 2016, 8 pgs.
Energous Corp., IPRP, PCT/US2015/067275, Jul. 4, 2017, 7 pgs.
Energous Corp., ISRWO, PCT/US2015/067245, Mar. 17, 2016, 8 pgs.
Energous Corp., IPRP, PCT/US2015/067245, Jun. 27, 2017, 7 pgs.
Energous Corp., ISRWO, PCT/US2014/041546, Oct. 16, 2014, 12 pgs.
Energous Corp., IPRP, PCT/US2014/041546, Dec. 29, 2015, 9 pgs.
Energous Corp., ISRWO, PCT/US2015/67250, Mar. 30, 2016, 11 pgs.
Energous Corp., IPRP, PCT/US2015/67250, Mar. 30, 2016, 10 pgs.
Energous Corp., ISRWO, PCT/US2015/067325, Mar. 10, 2016, 9 pgs.
Energous Corp., IPRP, PCT/US2015/067325, Jul. 4, 2017, 8 pgs.
Energous Corp., ISRWO, PCT/US2014/040697, Oct. 10, 2014, 12 pgs.
Energous Corp., IPRP, PCT/US2014/040697, Dec. 8, 2015, 9 pgs.
Energous Corp., ISRWO, PCT/US2014/040705, Sep. 23, 2014, 8 pgs.
Energous Corp., IPRP, PCT/US2014/040705, Dec. 8, 2015, 6 pgs.
Energous Corp., ISRWO, PCT/US2015/067249, Mar. 29, 2016, 8 pgs.
Energous Corp., IPRP, PCT/US2015/067249, Jun. 27, 2017, 7 pgs.
Energous Corp., ISRWO, PCT/US2015/067246, May 11, 2016, 18 pgs.
Energous Corp., IPRP, PCT/US2015/067246, Jun. 27, 2017, 9 pgs.
Energous Corp., ISRWO, PCT/US2014/059317, Feb. 24, 2015, 13 pgs.
Energous Corp., IPRP, PCT/US2014/059317, Apr. 12, 2016, 10 pgs.
Energous Corp., ISRWO, PCT/US2014/049669, Nov. 13, 2014, 10 pgs.
Energous Corp., IPRP, PCT/US2014/049669, Feb. 9, 2016, 8 pgs.
Energous Corp., ISRWO, PCT/US2014/041323, Oct. 10, 2014, 10 pgs.
Energous Corp., IPRP, PCT/US2014/041323, Dec. 22, 2015, 8 pgs.
Energous Corp., ISRWO, PCT/US2014/048002, Nov. 13, 2014, 11 pgs.
Energous Corp., IPRP, PCT/US2014/048002, Feb. 12, 2015 8 pgs.
Energous Corp., ISRWO, PCT/US2014/062682, Feb. 12, 2015, 10 pgs.
Energous Corp., IPRP, PCT/US2014/062682, May 3, 2016, 8 pgs.
Energous Corp., ISRWO, PCT/US2014/049666, Nov. 10, 2014, 7 pgs.
Energous Corp., IPRP, PCT/US2014/049666, Feb. 9, 2016, 5 pgs.
Energous Corp., ISRWO, PCT/US2014/046961, Nov. 24, 2014, 16 pgs.
Energous Corp., IPRP, PCT/US2014/046961, Jan. 19, 2016, 8 pgs.
Energous Corp., ISRWO, PCT/US2015/067279, Mar. 11, 2015, 13 pgs.
Energous Corp., IPRP, PCT/US2015/067279, Jul. 4, 2017, 7 pgs.
Energous Corp., ISRWO, PCT/US2014/041342, Jan. 27, 2015, 10 pgs.
Energous Corp., IPRP, PCT/US2014/041342, Dec. 15, 2015, 8 pgs.
Energous Corp., ISRWO, PCT/US2014/046941, Nov. 6, 2014, 11 pgs.
Energous Corp., IPRP, PCT/US2014/046941, Jan. 19, 2016, 9 pgs.
Energous Corp., ISRWO, PCT/US2014/062661, Jan. 27, 2015, 12 pgs.
Energous Corp., IPRP, PCT/US2014/062661, May 3, 2016, 10 pgs.
Energous Corp., ISRWO, PCT/US2014/059871, Jan. 23, 2015, 12 pgs.
Energous Corp., IPRP, PCT/US2014/059871, Apr. 12, 2016, 9 pgs.
Energous Corp., ISRWO, PCT/US2014/045102, Oct. 28, 2014, 14 pgs.
Energous Corp., IPRP, PCT/US2014/045102, Jan. 12, 2016, 11 pgs.
Energous Corp., ISRWO, PCT/US2014/059340, Jan. 15, 2015, 13 pgs.
Energous Corp., IPRP, PCT/US2014/059340, Apr. 12, 2016, 11 pgs.
Energous Corp., ISRWO, PCT/US2015/067282, Jul. 5, 2016, 7 pgs.
Energous Corp., IPRP, PCT/US2015/067282, Jul. 4, 2017, 6 pgs.
Energous Corp., ISRWO, PCT/US2014/041558, Oct. 10, 2014, 8 pgs.
Energous Corp., IPRP, PCT/US2014/041558, Dec. 29, 2015, 6 pgs.
Energous Corp., ISRWO, PCT/US2014/045119, Oct. 13, 2014, 11 pgs.
Energous Corp., IPRP, PCT/US2014/045119, Jan. 12, 2016, 9 pgs.
Energous Corp., ISRWO PCT/US2014/045237, Oct. 13, 2014, 16 pgs.
Energous Corp., IPRP , PCT/US2014/045237, Jan. 12, 2016, 12 pgs.
Energous Corp., ISRWO , PCT/US2014/054897, Feb. 17, 2015, 10 pgs.
Energous Corp., IPRP , PCT/US2014/054897, Mar. 15, 2016, 8 pgs.
Energous Corp., ISRWO , PCT/US2015/067334, Mar. 3, 2016, 6 pgs.
Energous Corp., IPRP , PCT/US2015/067334, Jul. 4, 2017, 5 pgs.
Energous Corp., ISRWO , PCT/US2014/047963, Nov. 7, 2014, 13 pgs.
Energous Corp., IPRP , PCT/US2014/047963, Jan. 26, 2016, 10 pgs.
Energous Corp., ISRWO , PCT/US2014/054891, Dec. 18, 2014, 12 pgs.
Energous Corp., IPRP , PCT/US2014/054891, Mar. 15, 2016, 10 pgs.
Energous Corp., ISRWO , PCT/US2014/054953, Dec. 4, 2014, 7 pgs.
Energous Corp., IPRP , PCT/US2014/054953, Mar. 22, 2016, 5 pgs.
Energous Corp., ISRWO , PCT/US2015/067294, Mar. 29, 2016, 7 pgs.
Energous Corp., IPRP , PCT/US2015/067294, Jul. 4, 2017, 6 pgs.
Energous Corp., ISRWO , PCT/US2014/062672 Jan. 26, 2015, 11 pgs.
Energous Corp., IPRP , PCT/US2014/062672 May 10, 2016, 8 pgs.
Energous Corp., ISRWO , PCT/US2014/044810 Oct. 21, 2014, 12 pgs.
Energous Corp., IPRP , PCT/US2014/044810, Jan. 5, 2016, 10 pgs.
Energous Corp., ISRWO , PCT/US2015/067271, Mar. 11, 2016, 6 pgs.
Energous Corp., IPRP , PCT/US2015/067271, Jul. 4, 2017, 5 pgs.
Energous Corp., ISRWO , PCT/US2014/040648, Oct. 10, 2014, 11 pgs.
Energous Corp., IPRP , PCT/US2014/040648, Dec. 8, 2015, 8 pgs.
Energous Corp., ISRWO , PCT/US2014/049673, Nov. 18, 2014, 10 pgs.

(56) References Cited

OTHER PUBLICATIONS

Energous Corp., IPRP, PCT/US2014/049673, Feb. 9, 2016, 6 pgs.
Energous Corp., ISRWO, PCT/US2014/068282, Mar. 19, 2015, 13 pgs.
Energous Corp., IPRP, PCT/US2014/068282, Jun. 7, 2016, 10 pgs.
Energous Corp., ISRWO, PCT/US2014/068586, Mar. 20, 2015, 11 pgs.
Energous Corp., IPRP, PCT/US2014/068586, Jun. 14, 2016, 8 pgs.
Energous Corp., ISRWO, PCT/US2016/068504, Mar. 30, 2017, 8 pgs.
Energous Corp., ISRWO, PCT/US2016/068495, Mar. 30, 2017, 9 pgs.
Energous Corp., ISRWO, PCT/US2015/067287, Feb. 2, 2016, 8 pgs.
Energous Corp., IPRP, PCT/US2015/067287, Jul. 4, 2017, 6 pgs.
Energous Corp., ISRWO, PCT/US2016/068551, Mar. 17, 2017, 8 pgs.
Energous Corp., ISRWO, PCT/US2016/068498, May 17, 2017, 8 pgs.
Energous Corp., ISRWO, PCT/US2016/068993, Mar. 13, 2017, 12 pgs.
Energous Corp., ISRWO, PCT/US2016/068565, Mar. 8, 2017, 11 pgs.
Energous Corp., ISRWO, PCT/US2016/068987, May 8, 2017, 10 pgs.
Energous Corp., ISRWO, PCT/US2016/069316, Mar. 16, 2017, 15 pgs.
Supplementary European Search Report, EP Patent Application No. EP14818136-5, Jul. 21, 2016, 9 pgs.
European Search Report, EP Patent Application No. EP16189052.0, Jan. 31, 2017, 11 pgs.
European Search Report, EP Patent Application No. EP16189319-3, Feb. 1, 2017, 9 pgs.
European Search Report, EP Patent Application No. EP14822971, Feb. 1, 2017, 9 pgs.
European Search Report, EP Patent Application No. EP16189987, Feb. 1, 2017, 8 pgs.
European Search Report, EP Patent Application No. 16196205.5, Mar. 28, 2017.
European Search Report, EP Patent Application No. 16189300, Feb. 28, 2017, 4 pgs.
European Search Report, EP Patent Application No. 16189988.5, Mar. 1, 2017, 4 pgs.
European Search Report, EP Patent Application No. 16189982.5, Jan. 27, 2017, 9 pgs.
European Search Report, EP Patent Application No. 16189974, Mar. 2, 2017, 5 pgs.
European Search Report, EP Patent Application No. 16193743, Feb. 2, 2017, 5 pgs.
European Search Report, EP Patent Application No. 14868901.1, Jul. 7, 2017, 5 pgs.
L.H. Hsieh et al. Development of a Retrodirective Wireless Microwave Power Transmission System, IEEE, 2003 pp. 393-396.
B.D. Van Veen et al., Beamforming: A Versatile Approach to Spatial Filtering, IEEE, ASSP Magazine, Apr. 1988, pp. 4-24.
Leabman, Adaptive Band-partitioning for Interference Cancellation in Communication System, Thesis Massachusetts Institute of Technology, Feb. 1997, pp. 1-70.
Panda, SIW based Slot Array Antenna and Power Management Circuit for Wireless Energy Harvesting Applications, IEEE APSURSI, Jul. 2012, 2 pgs.
Singh, Wireless Power Transfer Using Metamaterial Bonded Microstrip Antenna for Smart Grid WSN: In Fourth International Conference on Advances in Computing and Communications (ICACC), Aug. 27-29, 2014, Abstract 299.
T. Gill et al. "A System for Change Detection and Human Recognition in Voxel Space using the Microsoft Kinect Sensor," 2011 IEEE Applied Imagery Pattern Recognition Workshop. 8 pgs.
J. Han et al. Enhanced Computer Vision with Microsoft Kinect Sensor: A Review, IEEE Transactions on Cybernetics vol. 43, No. 5. pp. 1318-1334.
Zhai, "A Practical wireless charging system based on ultrawideband retro-reflective beamforming" 2010 IEEE Antennas and Propagation Society International Symposium, Toronto, ON 2010, pp. 1-4.
Mao: BeamStar: An Edge-Based Approach to Routing in Wireless Sensors Networks, IEEE Transactions on Mobile Computing, IEEE Service Center, Los Alamitos, CA US, vol. 6, No. 11, Nov. 1, 2007, 13 pgs.
Smolders—Institute of Electrical 1-15 and Electronics Engineers: "Broadband microstrip array antennas" Digest of the Antennas and Propagation Society International Symposium. Seattle, WA Jun. 19-24, 1994. Abstract 3 pgs.
Paolo Nenzi et al; "U-Helix: On-chip short conical antenna", 2013 7th European Conference on Antennas and Propagation (EUCAP), ISBN:978-1-4673-2187-7, IEEE, Apr. 8, 2013, 5 pgs.
Adamiuk G et al; "Compact, Dual-Polarized UWB-Antenna, Embedded in a Dielectric" IEEE Transactions on Antenna and Propagation, IEEE Service Center, Piscataway, NJ, US vol. 56, No. 2, ISSN: 0018-926X, abstract; Figure 1, Feb. 1, 2010, 8 pgs.
Mascarenas et al.; "Experimental Studies of Using Wireless Energy Transmission for Powering Embedded Sensor Nodes." Nov. 28, 2009, Journal of Sound and Vibration, pp. 2421-2433.

\* cited by examiner

INTEGRATED MINIATURE PIFA WITH ARTIFICIAL MAGNETIC CONDUCTOR METAMATERIALS

BACKGROUND

Field of the Disclosure

The present disclosure relates in general to antennas, and more specifically, to compact and directional planar inverted-F antennas (PIFAs) integrated in artificial magnetic conductor metamaterials which may be used for wireless power transmission.

Background

Wireless power transmission may include a transmitter for forming and directing radio frequency (RF) waves towards a receiver which may convert RF waves into usable power for charging or powering an electronic device. The receiver may be integrated in the electronic device (e.g., a smartphone, a tablet) or may be in the form of cases that may be operatively coupled with the electronic device for suitable charging or powering. The transmitter may be an antenna array that may include N antennas which may be directional.

The antenna array may be controlled by computer hardware and software in order to broadcast a wireless signal towards the receiver. Amplitude and phase among other properties of the transmitted RF waves may be tuned by the computer hardware and software to form constructive and destructive interference patterns generating pockets of energy in a 3-dimensional shape from the constructive patterns, and null spaces from the destructive patterns to aim the pockets of energy to specific receivers.

The number of antennas in the antenna array may vary in relation with the desired power range and transmission capability of the transmitter. The more antennas the wider the range and higher the power transmission potential available at the transmitter. More antennas may additionally enable the transmitter to target more receivers at once. Directional antenna designs that can be integrated in transmitters may include Yagi, log-periodic, corner reflectors, and parabolic antennas, among others.

However, size may be one important factor that may impact the number of antennas that can be integrated in the antenna array for the transmitter. Designers often look for the optimal combination of size and performance in the antennas integrated in the transmitter, where the performance is usually hampered when size is reduced.

Planar inverter F antennas (PIFA) may be fabricated in small form factors that may allow for dense antenna arrays. However, PIFA antennas' radiation pattern is commonly omnidirectional, which might mean than a transmitter including an antenna array of PIFA antennas may waste transmitted power. Additionally the omnidirectional radiation patterns may hinder the transmitter ability to focus the transmitted RF waves to specific receivers.

For the foregoing reasons, there is a need for a directional antenna that may enable for the construction of tightly packaged antenna arrays that may render reasonable small sizes of antenna arrays while keeping a suitable performance.

SUMMARY

Various embodiments of a PIFA integrated with artificial magnetic conductors (AMC) metamaterials described herein may include a PIFA, an AMC metal layer, and a backing metal conductor formed on a multi-layer printed circuit board (PCB).

In one exemplary embodiment of the present disclosure, a folded ground planar array inverted-F (PIFA) is disclosed. The folded ground PIFA may include an antenna element with two or more slots formed over the top layer of a PCB, where these antenna slots may be designed for reducing the area of the antenna while keeping a suitable impedance bandwidth. These PIFA configurations may also include a ground element formed on the bottom layer of the PCB and operatively coupled with the antenna element through ground and signal vias. The ground element may include a slot designed for reducing the area of the ground while increasing the radiation efficiency of the PIFA system. The missing central ground area does not affect antenna operation except possibly in de-tuning the impedance bandwidth, which can be adjusted by the antenna element itself.

In one embodiment, a PIFA configuration may include a folded ground formed over the empty space of a PCB top layer, without interfering with the operation of an antenna element which may be also formed over the PCB top layer. This folded ground may be operatively connected with a ground element on the PCB bottom layer through folded ground vias. Folded ground may allow the reduction in the system area while maintaining an omnidirectional radiation pattern and a suitable performance in terms of impedance bandwidth and radiation efficiency.

In another embodiment of the present disclosure, an AMC unit cell may include an AMC metal layer and a backing metal layer. The AMC metal layer and the backing metal layer may be formed in the inner layers of a multi-layer PCB. In some embodiments, the edges of the AMC metal layer may be close to the edges of the AMC unit cell but not coincident.

In one embodiment, the AMC metal layer of an AMC unit cell may exhibit a square θ ring shape, while in other embodiments, the AMC metal layer may exhibit a square ring shape. Yet in other embodiments, the AMC metal layer may be of any shape and size. The shape and dimensions of the AMC unit cell may determine the frequency tuning of AMC unit cell functionality.

In one embodiment of the present disclosure, a first AMC metamaterial embodiment may be formed with 5×5 array of AMC unit cells, where each AMC unit cell may include an AMC metal layer that may exhibit a square θ ring shape and a backing metal layer. The first AMC metamaterial may be formed over a large multi-layer and monolithic PCB that may fit a plurality of AMC unit cells. According to some aspects of this embodiment, the 5×5 array of AMC unit cells may exhibit the properties of an AMC metamaterial. The AMC metamaterial may be tuned to a resonant frequency which may be designed to be the low-band edge of a desired frequency band.

In another embodiment, a second AMC metamaterial embodiment may be formed with 6×6 array of AMC unit cells, where each AMC unit cell may include an AMC metal layer which may exhibit a square ring shape, and a backing metal layer. The second AMC metamaterial may be formed over a large multi-layer and monolithic PCB that may fit a plurality of AMC unit cells. According to some aspects of this embodiment, the 5×5 array of AMC unit cells may exhibit the properties of an AMC metamaterial. The AMC metamaterial may be tuned to a resonant frequency which may be designed to be the low-band edge of a desired frequency band.

One exemplary embodiment of the present disclosure may include the integration of a PIFA with a first AMC metamaterial to form a first integrated antenna structure. In the first integrated antenna structure, the AMC metal layer and backing conductor of the first metamaterial may be formed on the inner layers of a four layer PCB, while antenna elements and ground elements of the PIFA may be formed on top and bottom layers of a PCB, respectively. In some embodiments, a hole may be made in the metal backing conductor to allow signal and ground vias from PIFA to traverse the backing metal layer without contact, while the folded ground vias in PIFA may be short-circuited with the backing metal layer.

Another exemplary embodiment of the present disclosure may include the integration of a PIFA with a second AMC metamaterial to form a second integrated antenna structure. In the second integrated antenna structure, the AMC metal layer and backing conductor of the second metamaterial embodiment may be formed on the inner layers of a four layer PCB, while antenna elements and ground elements of the PIFA may be formed on top and bottom layers of a PCB, respectively. In some embodiments, a hole may be made in the metal backing conductor to allow signal and ground vias from PIFA to traverse the backing metal layer without contact, while the folded ground vias in PIFA may be short-circuited with the backing metal layer.

In yet other embodiments, where the PIFA has no folded ground, folded ground vias of PIFA may still be formed in the PCB and be short-circuited with the backing metal layer.

According to some aspects of the present disclosure the integrated antenna structures may exhibit a directional radiator pattern.

The AMC metamaterial in the integrated antenna structures may operate as an artificial magnetic reflector that may send upwards all energy radiated by the PIFA, thus achieving a directional radiation pattern. More specifically, the integrated antenna structures may exhibit a directional broadside pattern that may be about twice of that of the omnidirectional radiation pattern exhibited by PIFA alone. In addition, the relatively small system area of the integrated antenna structures may enable the fabrication of compact directional antenna arrays that may be suitable for small system area transmitters. The relatively small system area of the integrated antenna structures described herein may be considerable smaller than those of traditional directional antennas.

Numerous other aspects, features and benefits of the present disclosure may be made apparent from the following detailed description taken together with the drawing figures.

BRIEF DESCRIPTION OF THE DRAWINGS

The present disclosure can be better understood by referring to the following figures. The components in the figures are not necessarily to scale, emphasis instead being placed upon illustrating the principles of the disclosure. In the figures, reference numerals designate corresponding parts throughout the different views.

DETAILED DESCRIPTION

Figure 1:
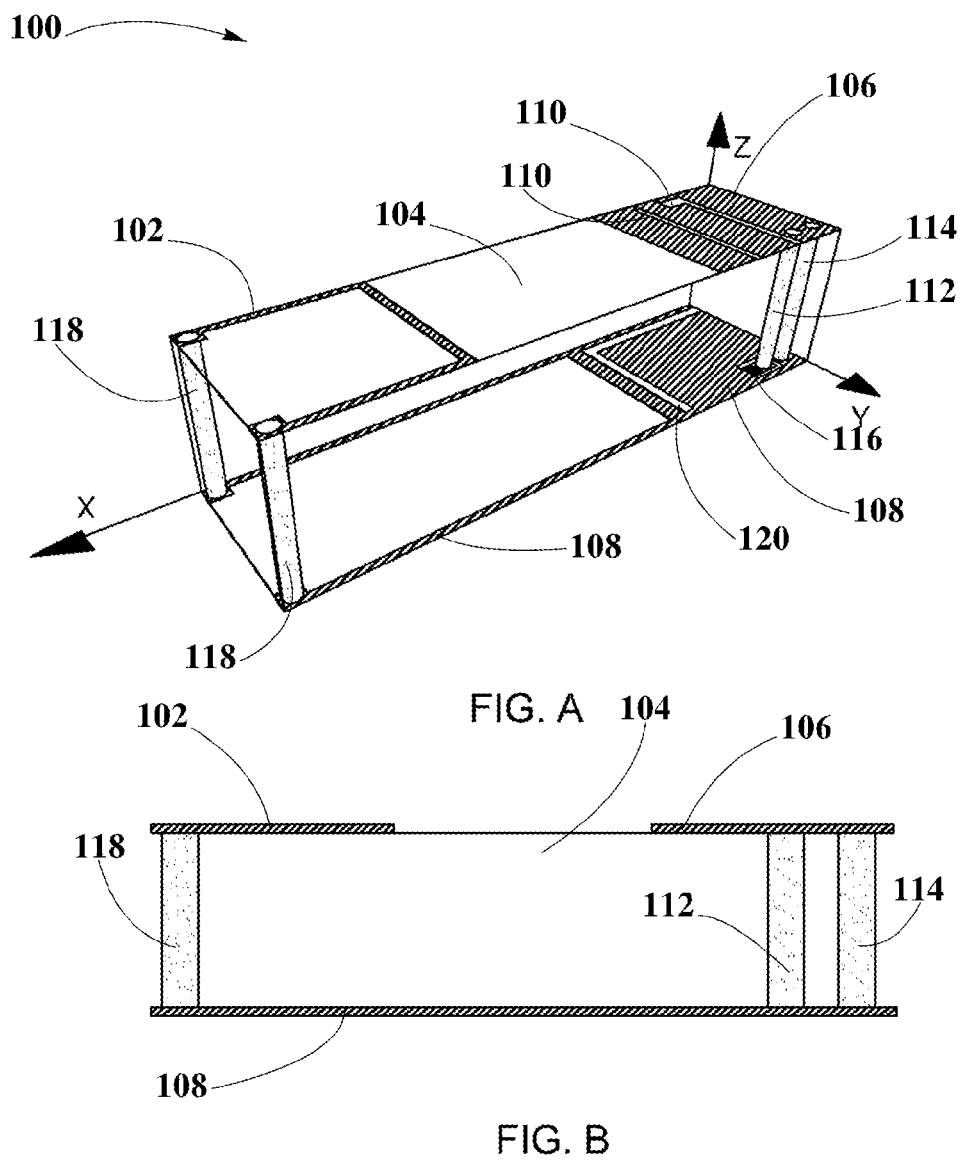
FIG. 1A shows an isometric view of a planar inverted-F antenna integrated in a printed circuit board, according to an embodiment.
FIG. 1B illustrates a side view of planar inverted-F antenna integrated in a printed circuit board, according to an embodiment.

The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

DEFINITIONS

"Pocket-forming" may refer to generating two or more RF waves which converge in 3-d space, forming controlled constructive and destructive interference patterns.

"Pockets of energy" may refer to areas or regions of space where energy or power may accumulate in the form of constructive interference patterns of RF waves.

"Null-space" may refer to areas or regions of space where pockets of energy do not form because of destructive interference patterns of RF waves.

"Transmitter" may refer to a device, including a chip which may generate two or more RF signals, at least one RF signal being phase shifted and gain adjusted with respect to other RF signals, substantially all of which pass through one or more RF antenna such that focused RF signals are directed to a target.

"Receiver" may refer to a device which may include at least one antenna, at least one rectifying circuit and at least one power converter for powering or charging an electronic device using RF waves.

"Adaptive pocket-forming" may refer to dynamically adjusting pocket-forming to regulate power on one or more targeted receivers.

"Metamaterial" a synthetic composite material with a structure such that it exhibits properties not usually found in natural materials. For example naturally occurring materials normally exhibit a positive refraction index for electromagnetic waves. However, fabricated metamaterials may exhibit a negative refractive index.

"AMC Metamaterial" may refer to an artificial magnetic conductor (AMC) metamaterial that exhibits functionality so that the complex reflection coefficient (S) of a normally incident plane wave, at the material's surface, be S≈1. This makes the total electric field, tangential to the material's surface (which is the sum of the incident and reflected electric fields) to be twice as large as the incident field. In contrast, on common metal surfaces (electric conductors), the total field under these conditions is null. More generally, the material exhibits sufficient AMC bandwidth defined as the frequency band where the real part of the complex reflection coefficient is greater than zero (Re{S}≥0).

"AMC Unit cell" may refer to the parts from which an AMC metamaterial may be composed.

DESCRIPTION OF THE DRAWINGS

In the following detailed description, reference is made to the accompanying drawings, which form a part hereof. In the drawings, which may not be to scale or to proportion, similar symbols typically identify similar components, unless context dictates otherwise. The illustrative embodiments described in the detailed description, drawings and claims, are not meant to be limiting. Other embodiments may be used and/or other changes may be made without departing from the spirit or scope of the present disclosure.

The present disclosure relates to antennas, and more specifically, to compact and directional planar inverted-F antennas (PIFAs) with metamaterials that may be integrated in antenna arrays for wireless power transmission. An antenna design with small system area may be integrated in artificial magnetic conductor (AMC) metamaterial. The AMC metamaterial may provide the antenna with directionality that may enable the fabrication of compact directional antenna arrays.

Miniature PIFA Architecture

FIG. 1 illustrates a PIFA 100 with a folded ground 102 that may be formed over the top and bottom layers of a multi-layer printed circuit board (PCB). FIG. 1A shows of an isometric view of PIFA 100 according to embodiments of the present disclosure. FIG. 1B shows a side view of PIFA 100.

FIG. 1A illustrates an isometric view of PIFA 100 which may be designed to be as small as possible while maintaining suitable performance for wireless power transmission, and it may be formed in a multi-layer printed circuit board (PCB 104) for achieving a monolithic form. In one embodiment, PIFA 100 may be formed on its own PCB 104 which may be connected to the PCB of an electronic device or a transmitter. In another embodiment, several PIFAs 100 may be formed on a large multi-layer PCB that may be part of a transmitter.

PIFA 100 may include an antenna element 106 formed over the top layer of PCB 104, and a ground element 108 formed over the bottom layer of PCB 104. Both PCB layers may be made of suitable metals such as copper of small metal thickness relative to the total PCB 104 thickness.

Antenna element 106 may include two antenna slots 110 designed for reducing the area of antenna element 106 while maintaining a suitable bandwidth operation. More antenna slots 110 may be introduced on antenna element 106 for even further area reduction if necessary, according to application.

Similarly to antenna element 106, ground element 108 may include a ground slot 120 whose main purpose may be reducing the area of the ground element 108 while reducing losses and increasing radiation efficiency.

PIFA 100 may also include a signal via 112, a ground via 114, and a RF port 116 for electrical connection purposes. In one embodiment, a semi-rigid 50 Ohm coax cable can be connected to RF port 116 for prototype measurements. For integration purposes, PIFA 100 may be fed through RF port 116 by a transmission line integrated in a larger PCB.

Folded ground 102 on PIFA 100 may be formed over an empty region of PCB 104 top layer without interfering with the performance of antenna element 106. Folded ground 102 may be raised over the top layer of PCB 104 and may be connected to ground element 108 through folded ground vias 118 which may not significantly affect the performance of PIFA 100. Folded ground 102 may act as an extension of ground element 108.

According to some aspects of this embodiment, folded ground 102 may allow to reduce the dimensions of PIFA 100. PIFA 100 dimensions in the x-axis, y-axis, and z-axis may be about 10 mm, 3.0 mm, and 2.4 mm respectively, for a system area of about 30 mm$^2$ and a system volume of about 72 mm$^3$.

FIG. 1B illustrates a side view of PIFA 100 where folded ground 102 and antenna element 106 may be formed on top of PCB 104. Ground element 108 may be formed on the bottom of PCB 104. Folded ground vias 118, signal via 112, and ground via 114 are also shown in FIG. 1B.

Figure 2:
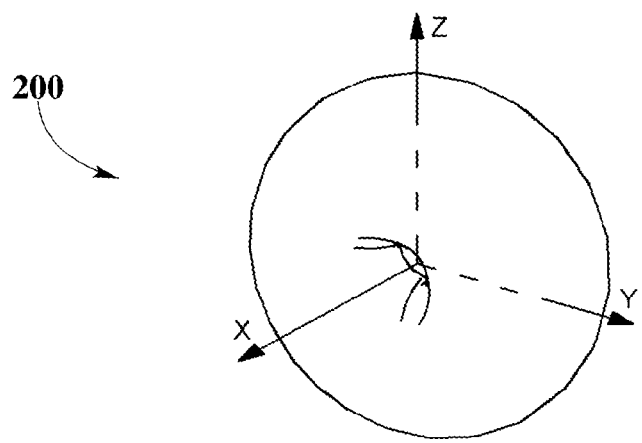
FIG. 2A shows an omnidirectional isometric radiation pattern of the PIFA, according to an embodiment.
FIG. 2B depicts the return loss of the PIFA when fed by a 50-Ohm port, according to an embodiment.
Figure 2:
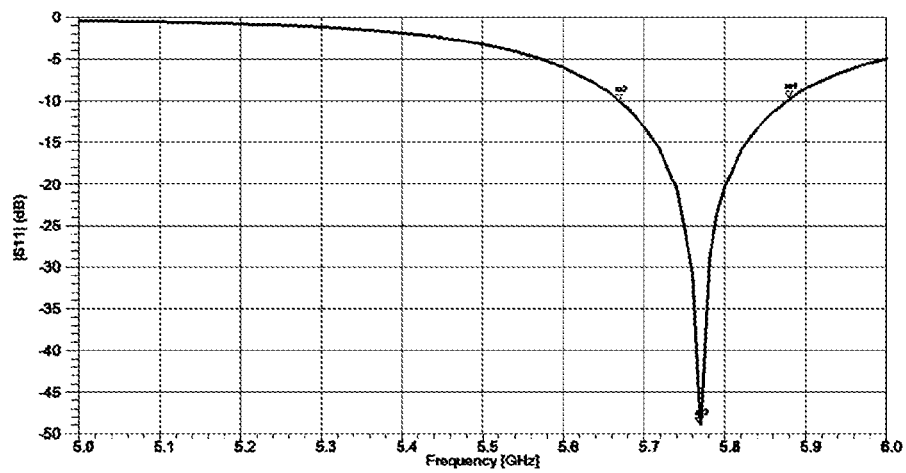

FIG. 2 shows an omnidirectional isometric radiation pattern 200 of PIFA 100 (as oriented in FIG. 1). This omnidirectional radiation pattern in FIG. 2A may be similar to radiation patterns exhibited in dipole antennas, thereby allowing flexible placement or integration of PIFA into larger form factors systems or PCBs. In one embodiment, PIFA 100 may exhibit a maximum gain of about +0.49 dBi at 5.8 GHz.

FIG. 2B illustrates the return loss of PIFA 100 when fed by a 50-Ohm port. As seen from probes m1 and m2, PIFA 100 may exhibit an impedance bandwidth of about 210 MHz at −10 dB, where this bandwidth may provide sufficient margins for possible detuning upon integration of PIFA into an electronic device or a larger PCB. Radiation efficiency of PIFA may be around 80% at about 5.8 GHz.

Although PIFA 100 may exhibit suitable characteristics for wireless power transmission, it may be an object of the following embodiments to provide integrated antenna structures with a similar monolithic PCB form factor, and performance in terms of bandwidth and radiation efficiency, but with a directional radiation pattern suitable for transmission of focused RF waves.

AMC Unit Cells and AMC Unit Cell Arrays

Figure 3:
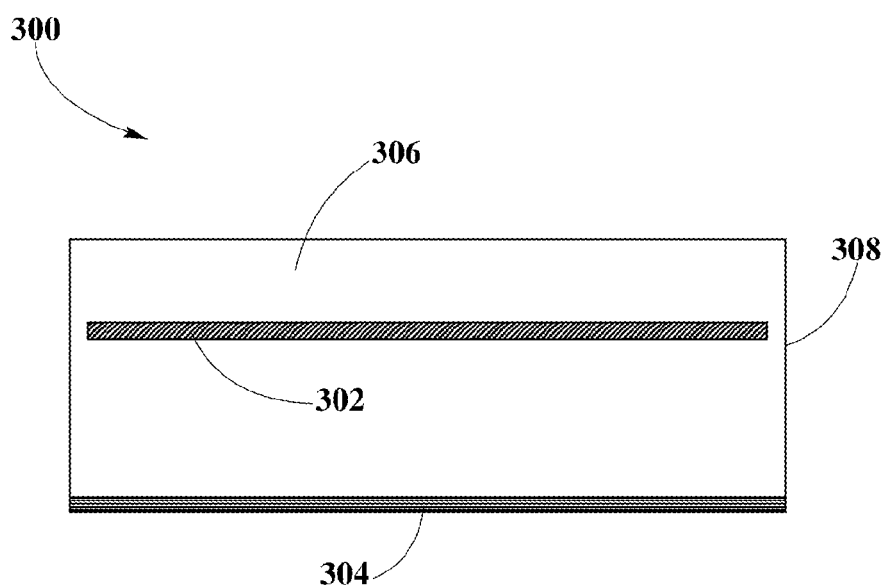
FIG. 3 illustrates a side view of an exemplary AMC unit cell of an AMC metamaterial, according to an embodiment.

FIG. 3 illustrates a side view of an exemplary embodiment of an AMC unit cell 300 of an AMC metamaterial in which PIFA 100 may be integrated. AMC Unit cell 300 may include an AMC metal layer 302, a backing metal layer 304. AMC Unit cell 300 may be formed in a multi-layer printed circuit board (PCB 306) for achieving a monolithic form. Edge 308 of AMC unit cell 300 may be close to AMC metal layer 302 but not coincident to edge 308 of AMC metal layer 302. In one embodiment, several AMC unit cells 300 of an AMC metamaterial may be formed on a larger multi-layer PCB.

A large variety of elements design in an AMC unit cell 300 may be realized on a multi-layer PCB 306 that may fulfill the required functionality of an AMC metamaterial. Arrays of AMC unit cells 300 may additionally be integrated with PIFAs; two exemplary designs are illustrated and listed in the following description.

First AMC Unit Cell Exemplary Embodiment

Figure 4:
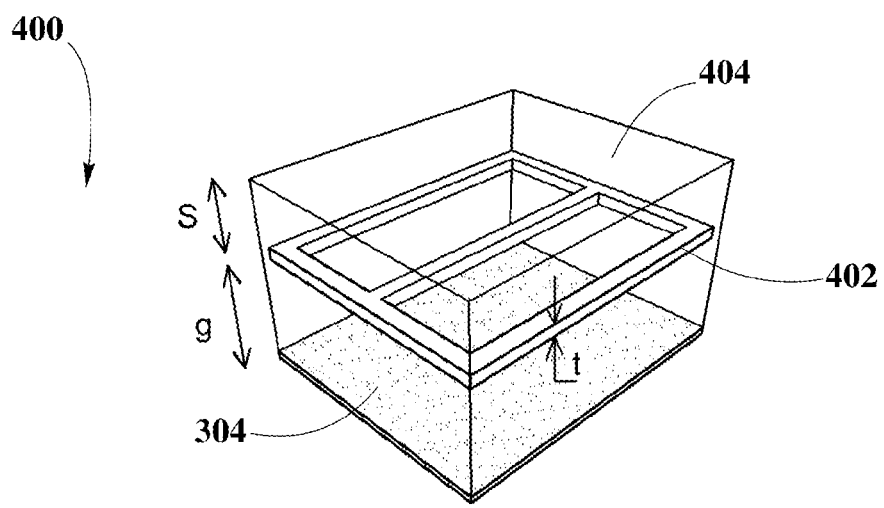
FIG. 4A illustrates an isometric view of a unit cell of an AMC metamaterial that may include AMC metal layers resembling a square θ ring, according to an embodiment.
FIG. 4B illustrates a top view of the AMC unit cell of an AMC metamaterial, according to an embodiment.
Figure 4:
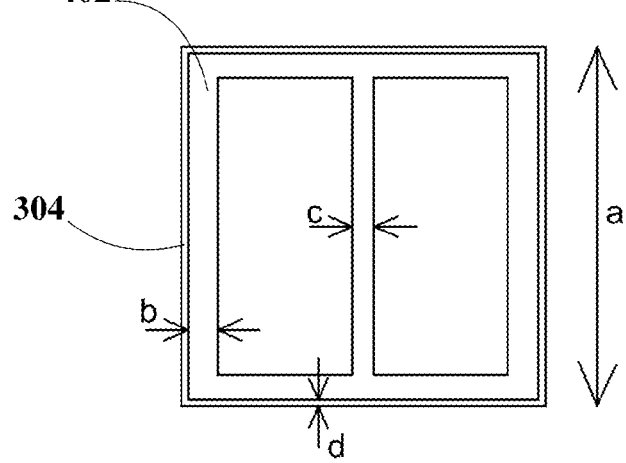

FIG. 4 illustrates an exemplary design of an AMC unit cell 400 according to an embodiment. FIG. 4A illustrates an isometric view of AMC unit cell 400, while FIG. 4B illustrates a top-view of AMC unit cell 400.

FIG. 4A illustrates an isometric view of AMC unit cell 400 that may include an AMC metal layer 402 and backing metal layer 304. AMC metal layer 402 may exhibit a square θ ring shape, and may be formed on at least one inner layer of a multi-layer PCB 404. Backing metal layer 304 may be formed on another layer of PCB 404.

Dimensions of AMC unit cell 400 illustrated in FIG. 4A may be about 0.06 mm, 0.887 mm, and 1.453 mm for t, s, and g, respectively.

A side view of AMC unit cell 400 is illustrated in FIG. 4B. Distance (d) between outer edge of AMC unit cell 400 and outer edge of AMC metal layer 402 may be about 0.0425 mm. Dimensions of AMC metal layer 402 illustrated in FIG. 4B may be about 0.276 mm, 0.135 mm, and 3.581 mm for b, c, and a, respectively.

These dimensions as well as the shape exhibited by AMC metal layer 402 may determine the frequency tuning and bandwidth of AMC unit cell 400 functionality.

First AMC Metamaterial Exemplary Embodiment

Figure 5:
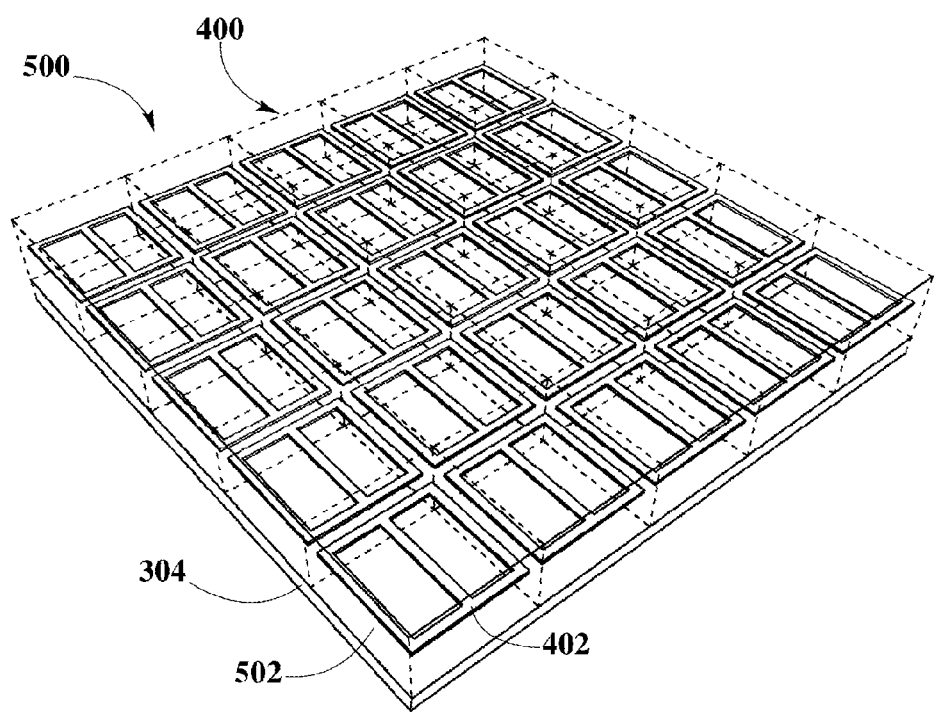
FIG. 5 illustrates an isometric view a 5×5 array AMC unit cells of an AMC metamaterial that may include AMC metal layers that may resemble a θ square ring, according to an embodiment.

FIG. 5 illustrates an exemplary embodiment of a first AMC metamaterial 500. AMC metamaterial 500 may exhibit a configuration of 5×5 array of AMC unit cells 400. AMC unit cells 400 in AMC metamaterial 500 may include AMC metal layer 402 and backing metal layer 304. AMC metamaterial 500 may be formed over a large monolithic multi-layer PCB 502 to fit a plurality of AMC unit cells 400. According to some aspects of this embodiment, AMC metamaterial 500 may exhibit the properties of an AMC metamaterial.

Figure 6:
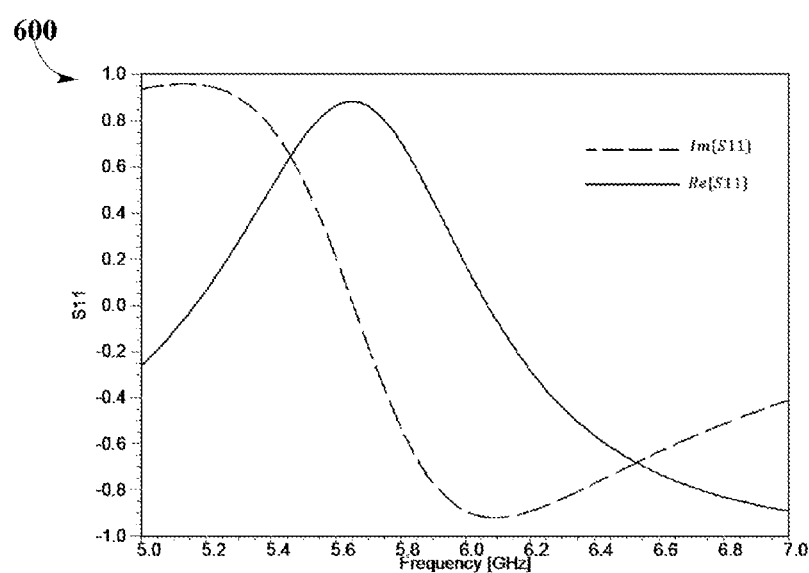
FIG. 6 illustrates the complex reflection coefficient of an incident plane wave at the surface of an AMC metamaterial that may include AMC metal layers that may resemble a square θ ring, according to an embodiment.

FIG. 6 illustrates the complex reflection coefficient graph 600 of AMC metamaterial 500 computed on its top surface, under normal plane wave incidence on a laterally infinite 2-dimensional artificial crystal. The real part of the reflection coefficient may have the property Re{S}≥0 in the frequency range of about 5.15 to about 6.05 GHz, for an estimated bandwidth of about 900 MHz. AMC metamaterial 500 may be tuned to a resonant frequency of about 5.65 GHz which may be designed to be the low-band edge of a desired impedance-matched frequency band. The corresponding value of the complex reflection coefficient for AMC metamaterial 500 at a resonant frequency of 5.65 GHz may be S=0.9+j0.

In one embodiment, AMC unit cell 400 dimensions may be about 0.068×0.068×0.046 $\lambda^3$, where λ may be the wavelength at the resonant frequency of the AMC unit cell 400. These dimensions exhibited by AMC unit cell 400 may be suitable for integration with small PIFAs such as PIFA 100. A plurality of AMC unit cells 400 may be required to recreate a metamaterial that may impose AMC functionality to an antenna such as PIFA 100.

Second AMC Unit Cell Exemplary Design

Figure 7:
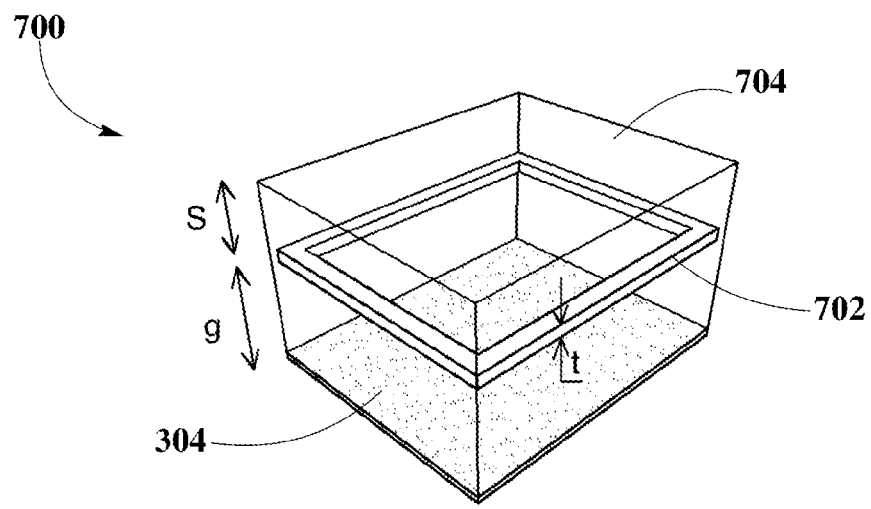
FIG. 7A shows an isometric view of an AMC unit cell of a metamaterial that may include AMC metal layers resembling a square ring, according to an embodiment.
FIG. 7B illustrates a top view of the AMC unit cell of an AMC metamaterial, according to an embodiment.
Figure 7:
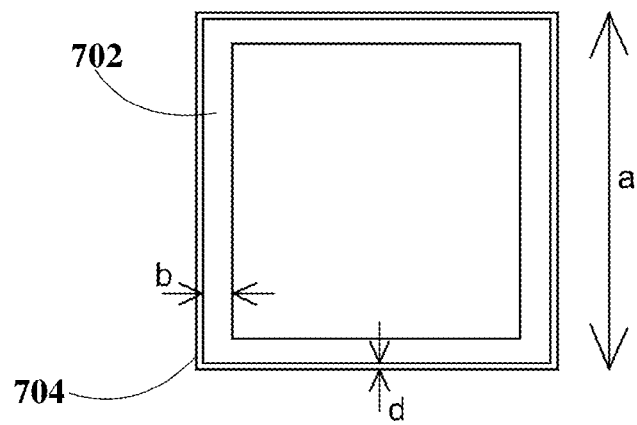

FIG. 7 illustrates an exemplary design of an AMC unit cell 700, according to an embodiment. FIG. 7A illustrates an isometric view of AMC unit cell 700, while FIG. 7B illustrates a top-view of AMC unit cell 700.

FIG. 7A illustrates an isometric view of an AMC unit cell 700 that may include an AMC metal layer 702 and backing metal layer 304. AMC metal layer 702 may exhibit a square ring shape and may be formed on one of the inner layers of a multi-layer PCB 704. Backing metal layer 304 may be formed on another layer of PCB 704.

Dimensions of AMC unit cell 700 illustrated in FIG. 7A may be about 0.06 mm, 0.887 mm, and 1.453 for t, s, and g, respectively.

A top view of AMC unit cell 700 is illustrated in FIG. 7B where distance (d) between outer edge of AMC unit cell 700 and outer edge of AMC metal layer 702 may be about 0.04 mm. Additionally, the dimensions of AMC metal layer 702 may be about 0.23 mm, and 3.0 mm for b, and a, respectively.

Second AMC Metamaterial Exemplary Embodiment

Figure 8:
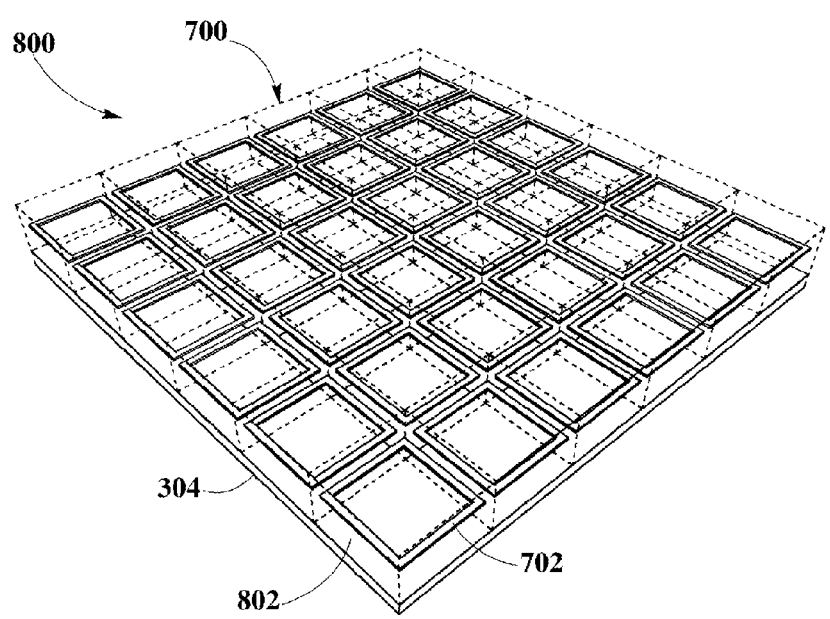
FIG. 8 illustrates an isometric view of a 6×6 array unit cells of an AMC metamaterial that may include AMC metal layers resembling a square ring, according to an embodiment.

FIG. 8 illustrates an exemplary embodiment of a second AMC metamaterial 800. AMC metamaterial 800 may exhibit a configuration of 6×6 array of AMC unit cells 700. AMC unit cells 700 in AMC metamaterial 800 may include AMC metal layer 702 and backing metal layer 304. AMC metamaterial 800 may be formed over a large monolithic multi-layer PCB 802 to fit a plurality of AMC unit cells 700. According to some aspects of this embodiment, AMC metamaterial 800 may exhibit the properties of an AMC metamaterial.

Figure 9:
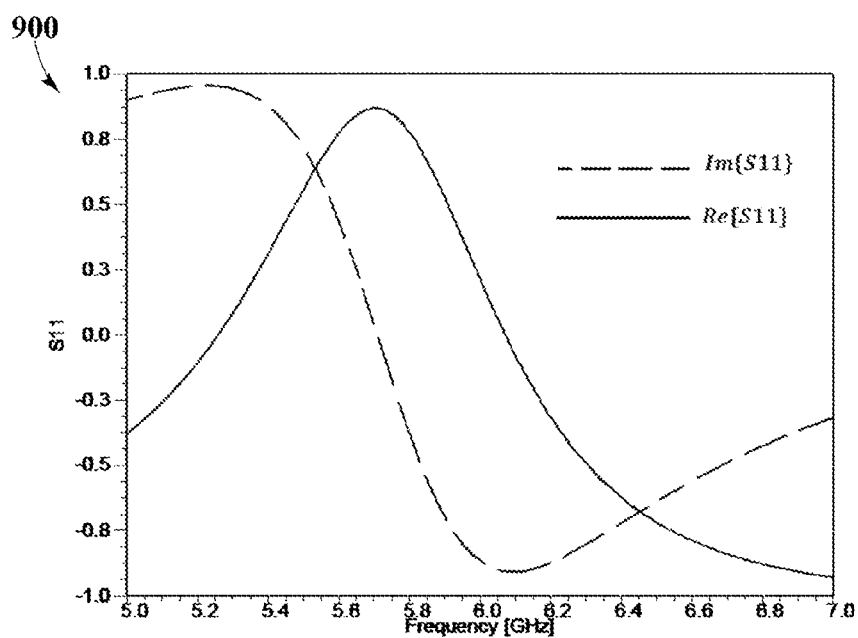
FIG. 9 shows the complex reflection coefficient of an incident plane wave at the surface of an AMC metamaterial that may include AMC metal layers that may resemble a square ring, according to an embodiment.

FIG. 9 illustrates the complex reflection coefficient response 900 of AMC metamaterial 800 computed on its top surface, under normal plane wave incidence on a laterally infinite 2-dimensional artificial crystal. The real part of the reflection coefficient may have the property Re{S}≥0 in the frequency range of about 5.25 to about 6.1 GHz, for an estimated bandwidth of about 850 MHz. AMC metamaterial 800 may be tuned to a resonant frequency of about 5.7 GHz which may be designed to be the low-band edge of a desired impedance-matched frequency band. The corresponding value of the complex reflection coefficient for AMC metamaterial 800 at a resonant frequency of 5.7 GHz may be S=0.9+j0.

In one embodiment, AMC unit cell 700 dimensions may be about $0.057 \times 0.057 \times 0.046$ $\lambda^3$, where $\lambda$ may be the wavelength at the resonant frequency of the AMC unit cell 700. These dimensions exhibited by AMC unit cell 700 may be suitable for integration with small PIFAs such as PIFA 100. A plurality of AMC unit cells 700 may be required to recreate a metamaterial that may impose AMC functionality to an antenna such as PIFA 100.

Integrated Antenna Structures

PIFA and AMC metamaterial integration may be realized on a multi-layer PCB that may fulfill the required functionality of a directional antenna; two exemplary embodiments of integrated antenna structures are illustrated and described below, where these integrated antenna structures may be part of a transmitter device configured for sending focused RF waves towards a receiver for wireless charging or powering.

Integrated Antenna Structure Including PIFA+First AMC Metamaterial

Figure 10:
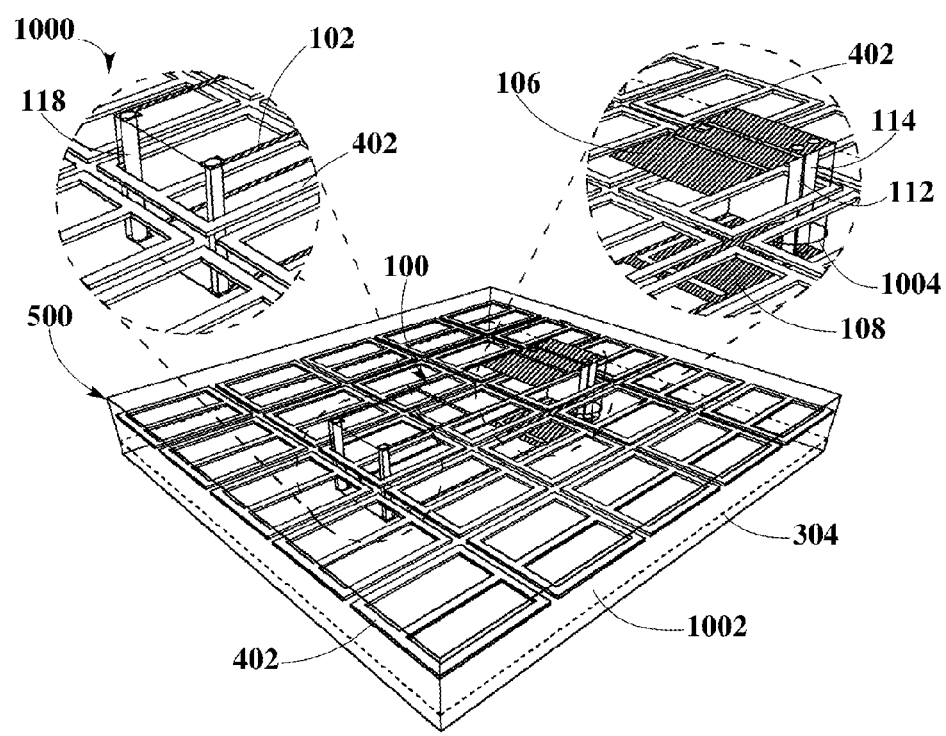
FIG. 10 illustrates an isometric view of an exemplary integration of a PIFA with AMC metamaterial that may include an AMC metal layer that may resemble a θ square ring, according to an embodiment.

FIG. 10 illustrates an isometric view of an exemplary integrated antenna structure 1000 that may include first AMC metamaterial 500 integrated with PIFA 100.

Integrated antenna structure 1000 may include a monolithic four layer PCB 1002 that may be used as a substrate to suitably integrate AMC metamaterial 500 with PIFA 100. For example, antenna element 106 and folded ground 102 of PIFA 100 may be formed on the top layer of PCB 1002; AMC metal layer 402 of AMC metamaterial 500 may be formed in one of the inner layers of PCB 1002; Backing metal layer 304 of AMC metamaterial 500 may be formed on the other available inner layer of PCB 1002; and ground element 108 of PIFA 100 may be formed on the bottom layer of PCB 1002.

A hole 1004 may be formed in backing metal layer 304 for allowing signal via 112 and ground via 114 to pass through backing metal layer 304 without electrically shortening it. As a result, ground element 108 of PIFA 100 shorted with backing metal layer 304 may become the primary ground of the integrated antenna structure 1000. At the opposite ends of this primary ground, folded ground vias 118 may short-circuit backing metal layer 304 at a crossing point. In another embodiment where PIFA 100 has no folded ground 102, folded ground vias 118 may be also formed to electrically short backing metal layer 304 and ground element 108.

In other embodiments, PIFA 100 may have different dimensions and configurations than those described in FIG. 1.

Figure 11:
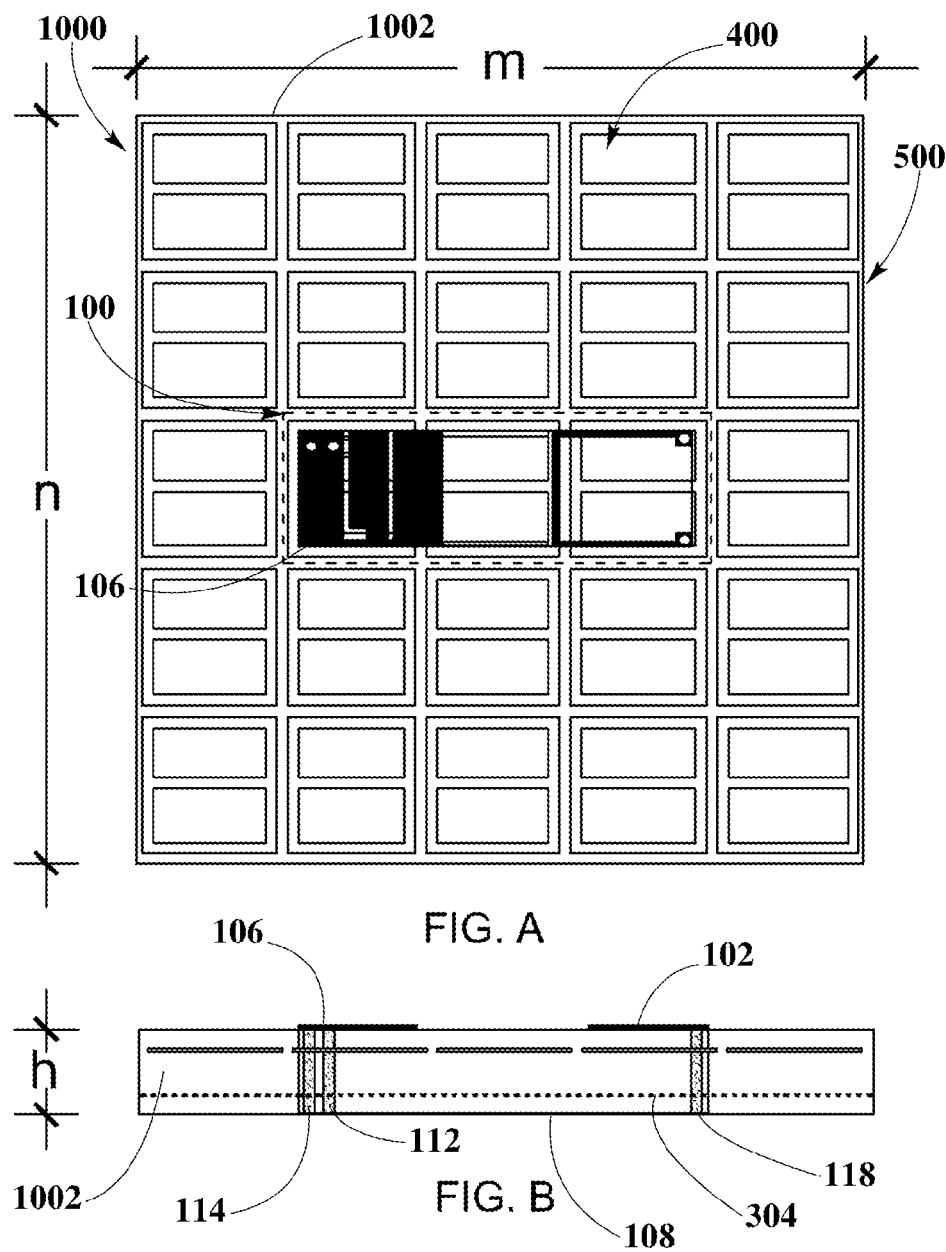
FIG. 11 illustrates a top and side view of an exemplary integration of a PIFA with AMC metamaterial that may include an AMC metal layer that may resemble a θ square ring, according to an embodiment.

FIG. 11 illustrates top and side views of integrated antenna structure 1000. In some embodiments, as illustrated in FIG. 11A, PIFA 100 may occupy about three AMC unit cells 400 of the AMC metamaterial 500 formed on PCB 1002. In some embodiments as illustrated in FIG. 11A, integrated antenna structure 1000 may include dimensions of about 18 mm and 18 mm for m and n respectively, for a system area of about 324 mm².

FIG. 11B shows a side view of integrated antenna structure 1000 where it may be noticed how the AMC metamaterial 500 is integrated with PIFA 100. As shown in FIG. 11B, antenna element 106 and folded ground 102 may be formed on top side of PCB 1002, while ground element 108 may be formed on the bottom side of PCB 1002. Backing metal layer 304 and AMC metal layer 402 may be formed in the inner layers of PCB 1002, between antenna element 106 and ground element 108. Folded ground vias 118, signal via 112, and ground via 114 are also illustrated in FIG. 11B according to embodiments described herein. Thickness h of integrated antenna structure 1000 may be about 2.4 mm.

Overall dimensions for integrated antenna structure 1000 may vary according to the dimensions used for the AMC unit cells 400 and PIFA 100, as well as the desired application.

Figure 12:
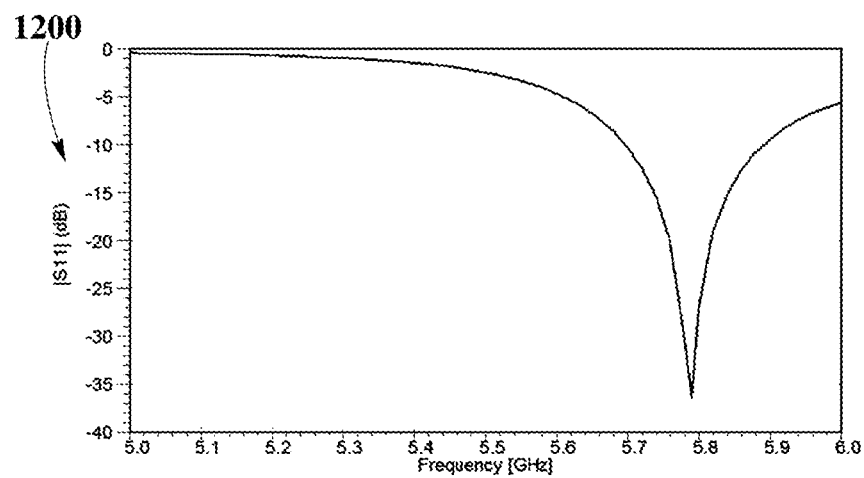
FIG. 12 illustrates the impedance bandwidth response and the radiation pattern of an exemplary integration of a PIFA with AMC metamaterial that may include an AMC metal layer that may resemble a square θ ring, according to an embodiment.
Figure 12:
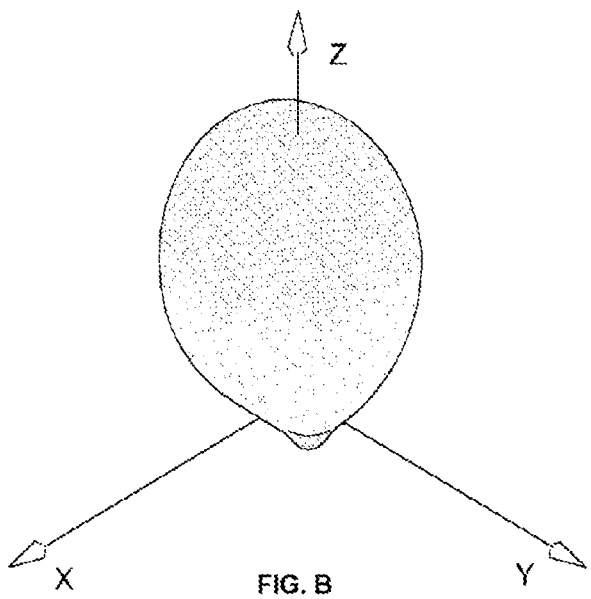

FIG. 12 illustrates the return loss and radiation pattern 1200 of exemplary integrated antenna structure 1000 when fed by a 50-Ohm port. As shown in FIG. 12A, integrated antenna structure 1000 may exhibit an impedance bandwidth of about 160 MHz at −10 dB, where this bandwidth may provide sufficient margins for possible detuning upon integration of the exemplary integrated antenna structure 1000 into an electronic device or a larger PCB. Radiation efficiency of integrated antenna structure 1000 may be of about 72% at 5.8 GHz. The 8% point-drop from the efficiency of PIFA 100 may be due to the integration of the AMC metamaterial 500, specifically the addition of the metallization layers, AMC metal layer 302 and backing metal layer 304.

FIG. 12B illustrates the radiation pattern of integrated antenna structure 1000, where the maximum gain may be of about 2.2 dBi at 5.8 GHz. Integrated antenna structure 1000 may exhibit a directional radiation pattern, more specifically, a directional broadside pattern that may be about twice of that of the omnidirectional radiation pattern exhibited by PIFA 100 in FIG. 2. In this way, by integrating the AMC metamaterial 500 with PIFA 100 in the integrated antenna structure 1000, the omnidirectional pattern of PIFA 100 may be changed to a directional pattern as exhibited in FIG. 12B, where the AMC metamaterial 500 may operate as an artificial magnetic reflector, sending all the energy upwards. Still, the overall dimensions of integrated antenna structure 1000 may be about $0.345 \times 0.345 \times 0.05$ $\lambda^3$ which may significantly smaller compared to conventional directional antennas such as a half-wave conductor-backed dipole. For example, a half-wave center-fed linear dipole with a quarter-wave backing metal reflector may need a system size of at least $0.5 \times 0.5 \times 0.25$ $\lambda^3$ to achieve a similar performance of integrated antenna structure 1000.

Integrated Antenna Structure Including PIFA+Second AMC Metamaterial Embodiment

Figure 13:
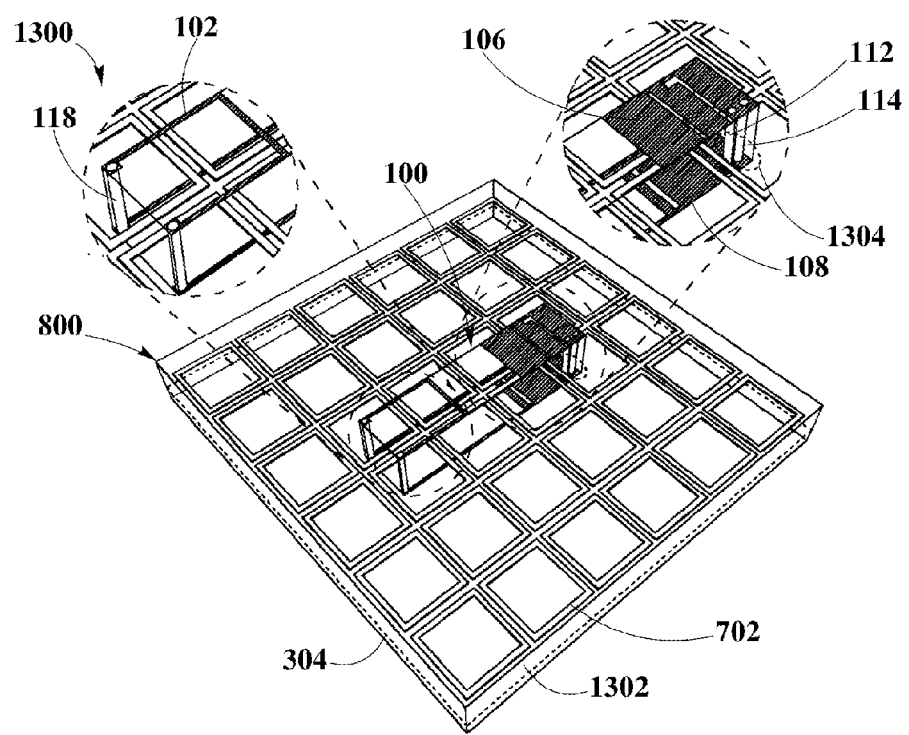
FIG. 13 illustrates an isometric view of an exemplary integration of a PIFA with AMC metamaterial that may include an AMC metal layer that may resemble a square ring, according to an embodiment.

FIG. 13 illustrates an isometric view of an exemplary integrated antenna structure 1300 that may include second AMC metamaterial 800 integrated with PIFA 100.

Integrated antenna structure 1300 may include a monolithic four layer PCB 1302 that may be used as a substrate to suitably integrate AMC metamaterial 800 with PIFA 100. For example, antenna element 106 and folded ground 102 of PIFA 100 may be formed on the top layer of PCB 1302; AMC metal layer 702 of AMC metamaterial 800 may be formed in one of the inner layers of PCB 1302; Backing metal layer 304 of AMC metamaterial 800 may be formed on the other available inner layer of PCB 1302; and ground element 108 of PIFA 100 may be formed on the bottom layer of PCB 1302.

A hole 1304 may be formed in backing metal layer 304 for allowing signal via 112 and ground via 114 to pass through backing metal layer 304 without electrically shortening it. As a result, ground element 108 of PIFA 100 shorted with backing metal layer 304 may become the primary ground of the integrated antenna structure 1300. At the opposite ends of this primary ground, folded ground vias 118 may short-circuit backing metal layer 304 at a crossing point. In another embodiment where PIFA 100 has no folded ground 102, folded ground vias 118 may be also formed to electrically short backing metal layer 304 and ground element 108.

In other embodiments, PIFA 100 may have different dimensions and configurations than those described in FIG. 1.

Figure 14:
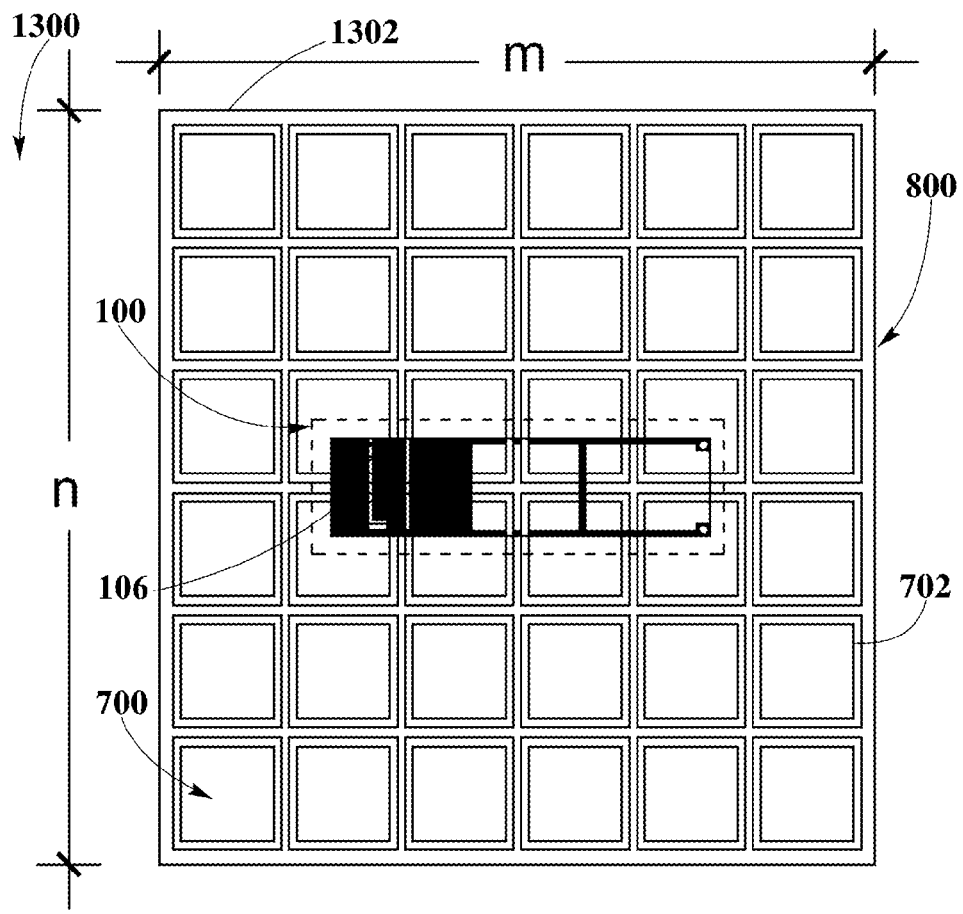
FIG. 14 illustrates a top and side view of an exemplary integration of a PIFA with AMC metamaterial that may include an AMC metal layer that may resemble a square ring, according to an embodiment.
Figure 14:
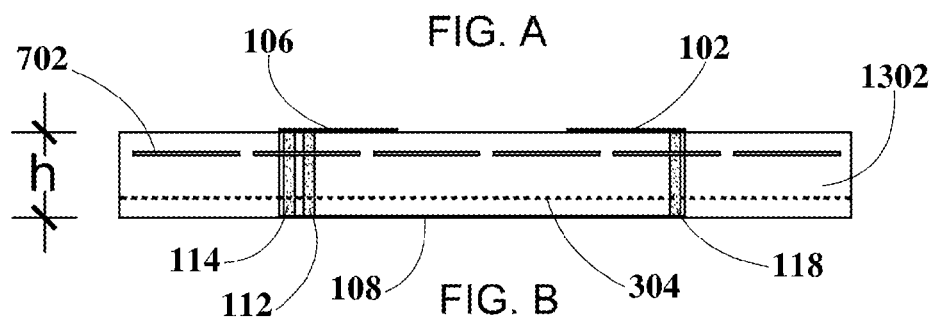

FIG. 14 illustrates top and side views of integrated antenna structure 1300. In some embodiments, as illustrated in FIG. 14A, PIFA 100 may occupy about eight AMC unit cells 700 of the AMC metamaterial 800 formed on PCB 1302. In some embodiments as illustrated in FIG. 14A, integrated antenna structure 1300 may include dimensions of about 18 mm and 18 mm for m and n respectively, for a system area of about 324 mm$^2$.

FIG. 14B shows a side view of integrated antenna structure 1300 where it may be noticed how the AMC metamaterial 800 is integrated with PIFA 100. As shown in FIG. 14B, antenna element 106 and folded ground 102 may be formed on top side of PCB 1302, while ground element 108 may be formed on the bottom side of PCB 1302. Backing metal layer 304 and AMC metal layer 702 may be formed in the inner layers of PCB 1302, between antenna element 106 and ground element 108. Folded ground vias 118, signal via 112, and ground via 114 are also illustrated in FIG. 14B according to embodiments described herein. Thickness h of integrated antenna structure 1300 may be about 2.4 mm.

Overall dimensions for integrated antenna structure 1300 may vary according to the dimensions used for the AMC unit cells 700 and PIFA 100, as well as the desired application.

Figure 15:
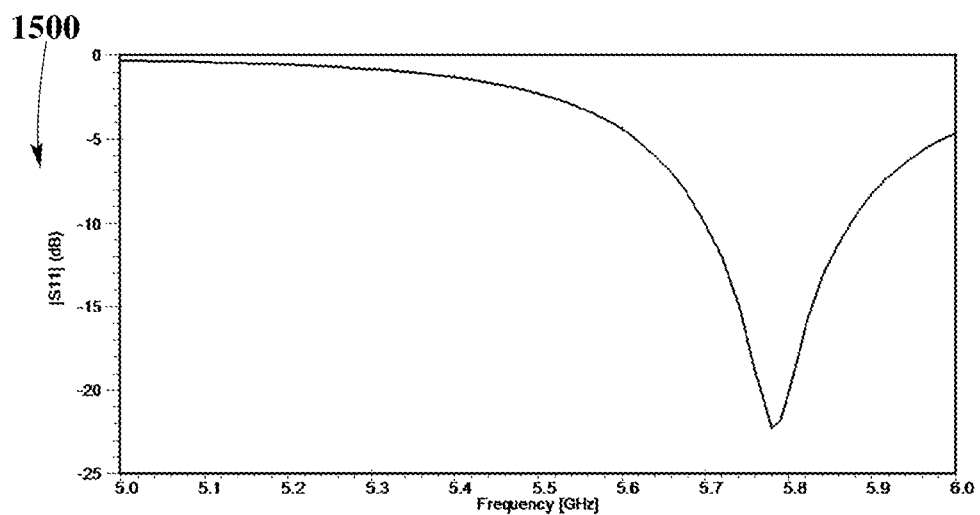
FIG. 15 illustrates the impedance bandwidth response and the radiation pattern of an exemplary integration of a PIFA with AMC metamaterial that may include an AMC metal layer that may resemble a square ring, according to an embodiment.
Figure 15:
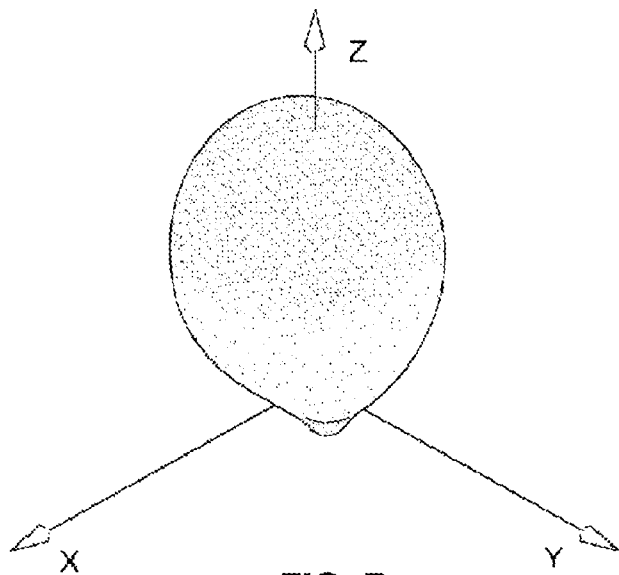

FIG. 15 illustrates the return loss and radiation pattern 1500 of exemplary integrated antenna structure 1300 when fed by a 50-Ohm port. As shown in FIG. 15A, integrated antenna structure 1300 may exhibit an impedance bandwidth of about 160 MHz at −10 dB, where this bandwidth may provide sufficient margins for possible detuning upon integration of the exemplary integrated antenna structure 1300 into an electronic device or a larger PCB. Radiation efficiency of integrated antenna structure 1300 may be of about 67% at 5.8 GHz. The 13% point-drop from the efficiency of PIFA 100 may be due to the integration of the AMC metamaterial 800, specifically the addition of the metallization layers, AMC metal layer 702 and backing metal layer 304, configured in a larger 6×6 array compared to the 5×5 array configured in AMC metamaterial 500, hence the larger amount of AMC metallization and radiation efficiency degradation.

FIG. 15B illustrates the radiation pattern of integrated antenna structure 1300, where the maximum gain may be of about 2.0 dBi at 5.8 GHz. Integrated antenna structure 1300 may exhibit a directional radiation pattern, more specifically a directional broadside pattern that may be about twice of that of the omnidirectional radiation pattern exhibited by PIFA 100 in FIG. 2. In this way, by integrating the AMC metamaterial 800 with PIFA 100 in the integrated antenna structure 1300, the omnidirectional pattern of PIFA 100 may be changed to a directional pattern as exhibited in FIG. 15B, where the AMC metamaterial 800 may operate as an artificial magnetic reflector, sending all the energy upwards. Still, the overall dimensions of integrated antenna structure 1300 may be about 0.345×0.345×0.05 λ$^3$ which may significantly smaller compared to conventional directional antennas such as a half-wave conductor-backed dipole. For example, a half-wave center-fed linear dipole with a quarter-wave backing metal reflector may need a system size of at least 0.5×0.5×0.25 to achieve a similar performance of integrated antenna structure 1300.

The embodiments of integrated antenna structures 1000, 1300 featuring the integration of first AMC metamaterial 500 and second AMC metamaterial 800 with PIFA 100 may suggest that as long as the two metamaterials may exhibit a similar response as shown in FIG. 6 and FIG. 9, the integration of PIFAs with metamaterials described herein may be robust and may lead to similar results as shown in FIG. 12 and FIG. 15.

While various aspects and embodiments have been disclosed herein, other aspects and embodiments are contemplated. The various aspects and embodiments disclosed herein are for purposes of illustration and are not intended to be limiting, with the true scope and spirit being indicated by the following claims.

The invention claimed is:

1. An antenna structure, comprising:
   a printed circuit board (PCB);
   at least one planar inverted F antenna (PIFA), configured within a top and bottom layer of the PCB, including a port coupled with the PCB to provide wireless power signals for radiation by the at least one PIFA; and
   at least one artificial magnetic conductor (AMC) cell configured within the PCB, the at least one AMC cell comprising:
   a backing metal layer arranged in a first inner layer of the PCB, and
   an AMC metal layer formed in a second inner layer of the PCB, the AMC metal layer having a predetermined shape,
   wherein the AMC metal layer is configured to reflect the wireless power signals radiated by the PIFA.

2. The antenna structure of claim 1, wherein the predetermined shape of the AMC metal layer comprises a square θ ring shape.

3. The antenna structure of claim 1, wherein the predetermined shape of the AMC metal layer comprises a square ring shape.

4. The antenna structure of claim 1, wherein the AMC metal layer is configured to reflect the wireless power signals radiated by at least one PIFA in a directional radiation pattern.

5. The antenna structure of claim 1, wherein the AMC metal layer comprises metamaterial.

6. The antenna structure of claim 1, wherein the at least one PIFA comprises:
   an antenna element formed over a first portion of the top layer of the PCB, the antenna element comprising one or more antenna slots,
   a ground element formed over a first portion of the bottom layer of the PCB, wherein the antenna element is coupled to the ground element using a first ground via and a second portion of the bottom layer of the PCB using a signal via coupled with the port, and
   a folded ground formed over a second portion of the top layer of the PCB, the folded ground being coupled to a third portion of the ground element using one or more second ground vias.

7. The antenna structure of claim 6, wherein the ground element comprises a ground slot.

8. The antenna structure of claim 6, wherein the top layer and bottom layer of the PCB comprise a conductive metal.

9. The antenna structure of claim 1, wherein transmitter, operatively coupled to the at least one PIFA, is configured to generate the wireless power signals provided to the at least one PIFA by the port.

10. The antenna structure of claim 9, wherein the transmitter comprises a processing apparatus for adjusting at least one of a phase and magnitude of each of the wireless power signals.

11. An apparatus for providing 3-dimensional pockets of energy using pocket-forming, comprising:

at least one printed circuit board (PCB);
a plurality of planar inverted F antennas (PIFAs), each configured within a top and bottom layer of the at least one PCB and including a port coupled with the PCB to provide wireless power signals for radiation; and
a plurality of artificial magnetic conductor (AMC) cells configured within the at least one PCB, each of the plurality of AMC cells comprising:
a backing metal layer arranged in a first inner layer of the at least one PCB, and an AMC metal layer formed in a second inner layer of the at least one PCB, the AMC metal layer having a predetermined shape,
wherein each of the plurality of AMC metal layers is configured to reflect the wireless power signals independently radiated by each of the PIFAs to enable pocket-forming of energy.

12. The apparatus of claim 11, wherein the predetermined shape of the AMC metal layer comprises a square θ ring shape.

13. The apparatus of claim 11, wherein the predetermined shape of the AMC metal layer comprises a square ring shape.

14. The apparatus of claim 11, wherein each of the plurality of AMC metal layers is configured to reflect the wireless power signals energy independently radiated by each of the plurality of PIFAs in a directional radiation pattern.

15. The apparatus of claim 11, wherein the AMC metal layer comprises metamaterial.

16. The apparatus of claim 11, wherein each of the plurality of PIFAs comprises:
an antenna element, configured over a first portion of the top layer of the at least one PCB, the antenna element comprising one or more antenna slots,
a ground element formed over a first portion of the bottom layer of the at least one PCB, wherein the antenna element is coupled to the ground element using a first ground via and a second portion of the bottom layer of the at least one PCB using a signal via coupled with the port, and
a folded ground formed over a second portion of the top layer of the at least one PCB, the folded ground being coupled to a third portion of the ground element using one or more second ground vias.

17. The apparatus of claim 16, wherein the ground element comprises a ground slot.

18. The apparatus of claim 16, wherein the top layer and bottom layer of the at least one PCB comprise a conductive metal.

19. The apparatus of claim 11, wherein transmitter, operatively coupled to the plurality of PIFAs, is configured to generate the wireless power signals provided to each of the plurality of PIFAs by the port.

20. The apparatus of claim 19, wherein the transmitter comprises a processing apparatus for adjusting at least one of a phase and magnitude of each of the wireless power signals.

21. A cell arrangement, comprising:
an artificial magnetic conductor (AMC) cell, the AMC cell arranged in a multi-layer printed circuit board (PCB), the AMC cell comprising a plurality of edges and further comprising:
a backing metal layer arranged in a first inner layer of the PCB;
at least one planar inverted F antenna (PIFA), configured within a top and bottom layer of the PCB, including a port coupled with the PCB to provide wireless power signals for radiation by the at least one PIFA; and
an AMC metal layer formed in a second inner layer of the PCB, the AMC metal layer comprising metamaterial and having a predetermined shape.

22. The cell arrangement of claim 21, wherein the backing metal layer is not coincident with at least one of the plurality of edges.

23. The cell arrangement of claim 21, wherein the predetermined shape of the AMC metal layer comprises a square θ ring shape.

24. The cell arrangement of claim 21, wherein the predetermined shape of the AMC metal layer comprises a square ring shape.

25. The cell arrangement of claim 21, wherein the metamaterial is tuned to a resonant frequency that is at a low end of a desired frequency band.

26. The cell arrangement of claim 21, wherein the at least one PIFA further comprises:
an antenna element formed over a first portion of a top layer of the PCB, the antenna element comprising one or more antenna slots,
a ground element formed over a first portion of the bottom layer of the at least one PCB, wherein the antenna element is coupled to the ground element using a first ground via and a second portion of the bottom layer of the at least one PCB using a signal via coupled with the port, and
a folded ground formed over a second portion of the top layer of the PCB, the folded ground being coupled to a third portion of the ground element using one or more second ground vias.

27. The cell arrangement of claim 26, wherein the AMC metal layer is configured to reflect the wireless power signals radiated by the at least one PIFA.

28. The cell arrangement of claim 27, wherein the AMC metal layer is configured to reflect the wireless power signals radiated by the at least one PIFA in a directional radiation pattern.

* * * * *

UNITED STATES PATENT AND TRADEMARK OFFICE
CERTIFICATE OF CORRECTION

| | | |
|---|---|---|
| PATENT NO. | : 9,871,301 B2 | Page 1 of 1 |
| APPLICATION NO. | : 14/336971 | |
| DATED | : January 16, 2018 | |
| INVENTOR(S) | : Contopanagos | |

It is certified that error appears in the above-identified patent and that said Letters Patent is hereby corrected as shown below:

In the Claims

Claim 14, Column 13, Line 26, please delete "signals energy independently" and insert --signals independently--;

Claim 19, Column 13, Line 51, please delete "wherein transmitter," and insert --wherein a transmitter,--.

Signed and Sealed this
Eighth Day of May, 2018

Andrei Iancu
*Director of the United States Patent and Trademark Office*